United States Patent

Schulze, Jr.

[11] Patent Number: 5,111,927
[45] Date of Patent: May 12, 1992

[54] AUTOMATED RECYCLING MACHINE

[76] Inventor: Everett E. Schulze, Jr., 1741 Fulton, Aurora, Colo. 80010

[21] Appl. No.: 520,715

[22] Filed: May 7, 1990

Related U.S. Application Data

[63] Continuation-in-part of Ser. No. 462,394, Jan. 5, 1990.

[51] Int. Cl.$^5$ ............................ G07F 7/06; B07C 5/00
[52] U.S. Cl. ................................ 194/209; 100/902; 209/644; 209/930
[58] Field of Search .............. 194/208, 209, 212, 213; 209/629, 644, 645, 930; 100/902; 241/99, 24, 19, 81

[56] References Cited

U.S. PATENT DOCUMENTS

| | | | |
|---|---|---|---|
| Re.276,43 | 5/1973 | Myers | 194/208 |
| 3,104,607 | 9/1963 | Galas | 241/99 X |
| 3,749,240 | 7/1973 | Spears et al. | 209/636 X |
| 3,792,765 | 2/1974 | Arp | 194/209 |
| 3,802,631 | 4/1974 | Boyd . | |
| 3,907,087 | 9/1975 | Tanaka | 100/902 X |
| 4,091,725 | 5/1978 | Arp | 100/45 |
| 4,102,263 | 7/1978 | Forsberg | 241/99 X |
| 4,265,170 | 5/1981 | Schulze . | |
| 4,436,026 | 3/1984 | Imamura et al. | 100/902 X |
| 4,454,028 | 6/1984 | Vetter | 209/548 |
| 4,483,248 | 11/1984 | Ostreng | 100/902 X |
| 4,512,253 | 4/1985 | LaBarge | 100/902 X |
| 4,597,487 | 7/1986 | Crosby et al. | 194/209 |
| 4,601,238 | 7/1986 | Davis et al. | 100/902 X |
| 4,715,920 | 12/1987 | Ruppman . | |
| 4,726,535 | 2/1988 | Snyder . | |
| 4,784,251 | 11/1988 | DeWoolfson et al. | 241/81 X |

*Primary Examiner*—F. J. Bartuska
*Attorney, Agent, or Firm*—Sheridan Ross & McIntosh

[57] ABSTRACT

A beverage container recycling machine is disclosed. The machine includes a first module for receiving and handling plastic containers, a second module for receiving and handling glass containers and a third module for receiving and handling metal containers. Each of the three modules is contained in the same housing or storage unit. Preferably, the machine includes one or more coupon dispensers for dispensing redeemable coupons and the machine is conveniently located near a store or other outlet at which the coupons can be redeemed. Each of the three modules is separately accessed but their operations are, preferably, under the common control of a single processor unit. The housing also contains a separate coin dispensing unit for each of the three modules and in one embodiment, both coins and a coupon are dispensed upon receipt of an acceptable container in the appropriate module.

9 Claims, 16 Drawing Sheets

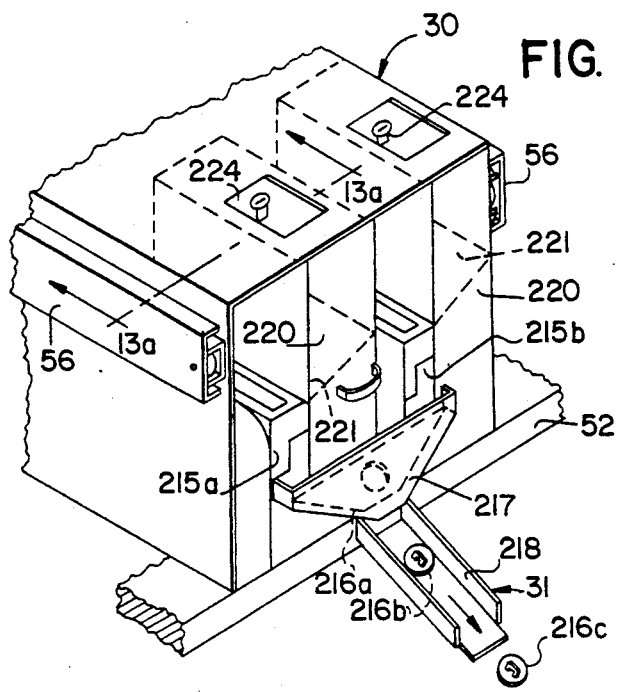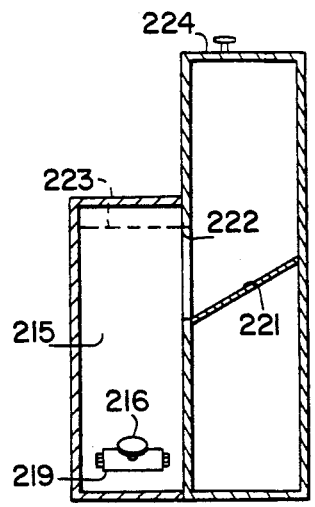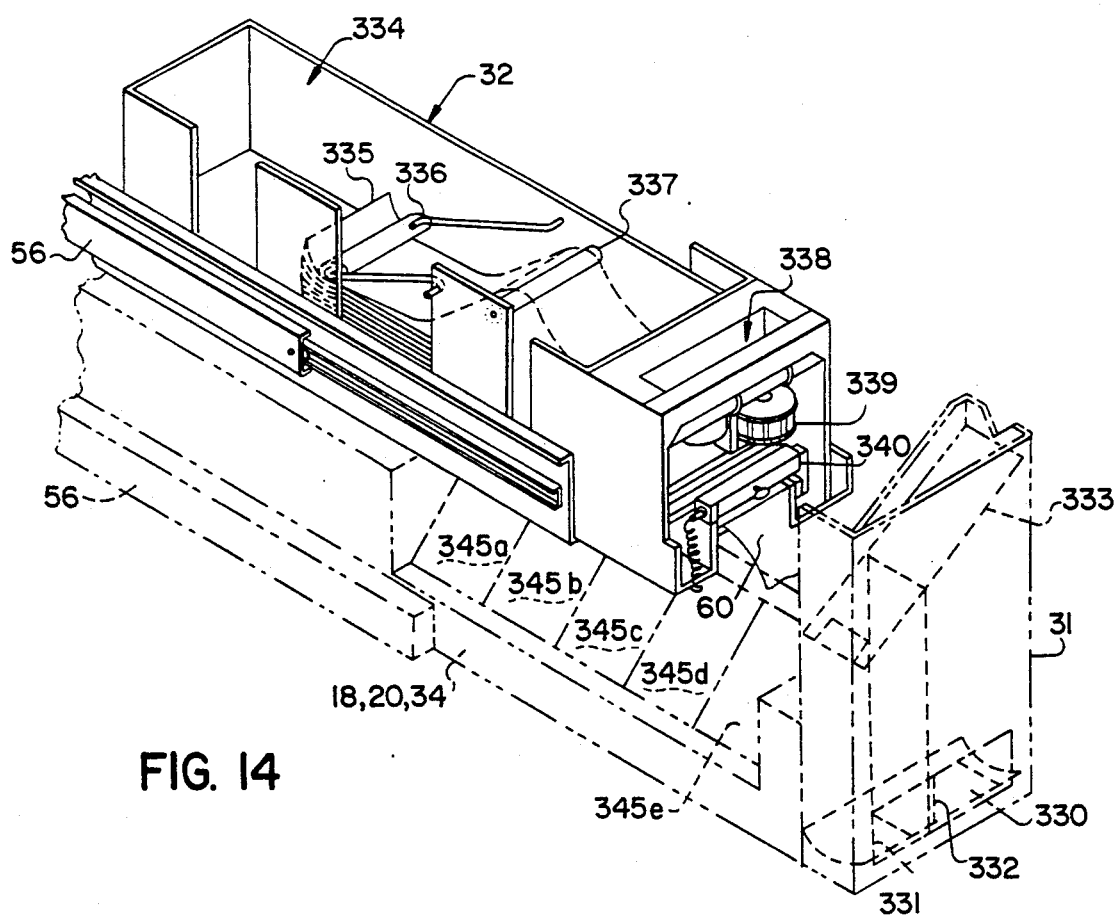

AUTOMATED RECYCLING MACHINE

RELATED APPLICATION

This application is a continuation-in-part of prior application Ser. No. 462,394 filed Jan. 5, 1990 by Everett E. Schulze, Jr. entitled "A Computerized Merchandising System", the benefit of the filing date of which is claimed under 35 USC 120.

FIELD

The invention relates to an automated recycling machine, and more particularly to a modular machine having one or more subassemblies for receiving, detecting, discriminating, sorting and crushing a variety of beverage containers, e.g. aluminum soda pop, juice and beer cans, bi-metal cans, plastic-liter bottles, and white, brown and green glass alcoholic and non-alcoholic beverage bottles. Depending on the type and size of container, the recycling machine accepts the container, crushes it, stores the crushed can or glass cullet and plastic on site for later periodic pick up, and pays the depositor (person) scrap value or the state mandated redemption value in cash, and/or that value in script or tokens, plus one or more incentive items, such as cents-off coupons, promotional games, coupons or tickets and sweepstakes entries and/or premium items.

BACKGROUND

Background of the Invention

Environmental issues and concerns have led to an increased awareness on the part of individuals, businesses, environmental groups and governmental agencies for the need to recycle materials associated with consumer products. A major category of recyclable materials are containers, which include beverage containers. Beverage containers are typically made of plastic, glass or metals including aluminum or a bi-metal composition of aluminum and steel. Separate recycling machines have been previously devised or proposed for receiving and handling one of plastic, glass and metal containers for recycling purposes.

In U.S. Pat. No. 4,454,028 to Vetter, issued Jun. 12, 1984 and entitled "Can Sorting Method and Apparatus," a can sorting method and apparatus is disclosed. In particular, a customer-operated machine is provided for receiving a number of containers and for separating, counting and documenting the count of the containers, while returning rejected containers to the customer or user. A plurality of containers can be fed into the hopper of the apparatus. The apparatus initially determines if the can is made of aluminum and if the can is empty. The apparatus displays the number of accepted containers, the current redemption value per unit of weight of aluminum and the money that is to be paid to the customer. Processing of so-called deformed cans by the apparatus is also disclosed. U.S. Pat. No. 4,512,253 to LaBarge, issued Apr. 23, 1985 entitled "Apparatus for Processing Recyclable Containers," describes a recyclable container apparatus for detecting the type of container material. In particular, an eddy current detection unit is provided, as well as an apparatus for measuring the height of the container and for issuing a receipt relating to the totals of one or more different types of containers that were received. The patent indicates the apparatus is able to distinguish between metal and non-metal containers, and further between aluminum and steel containers. To determine whether or not to accept or reject a particular container, the apparatus determines the height and weight of a container. The height and weight information is also used in determining whether or not the container is empty.

U.S. Pat. No. 3,907,087 to Tenaka, issued Sep. 23, 1975 and entitled "Device for Discharging Refund Coins and Crushing Metallic Cans of Different Sizes" relates to a can crushing apparatus that dispenses an amount of money based upon the size of the received container. That is, larger cans result in the dispensing of a larger amount of money than smaller cans.

U.S. Pat. Nos. 4,091,725, issued May 30, 1978, entitled "Container Crushing Device," and 3,792,765, issued Feb. 19, 1974, entitled "Apparatus for Crushing Containers and Dispensing Tokens," both to Arp, relate to a container crusher that is able to count the number of containers and which controls the crushing operation by determining whether or not the particular container weighs less than a predetermined maximum weight.

U.S. Pat. No. 4,483,248 to Ostreng, issued Nov. 20, 1984 entitled "Aluminum/Steel Can Separator and Baler," describes an aluminum/steel can separator, which indicates it is known to separate steel from aluminum using a magnet. Upstream of the position in the machine where steel cans are removed, there is a light source which is used to count containers that are processed by the machine.

U.S. Pat. No. 3,802,631, issued Apr. 9, 1974 to Boyd entitled "Waste Separating and Recycling system", describes a recycling system in which there is a separation among component parts including plastics, glass and metals. Plastic materials are separated by using air to remove the light plastic materials from the heavier materials. Magnetic separating means are used to separate out metallic substances.

U.S. Pat. No. 4,726,535 to Snyder, issued Feb. 23, 1988 entitled "Machine for Removing Caps and Base Cups from Plastic Bottles," describes a machine for detecting different materials that make up the body and base of a plastic container. The patent also discloses the use of sensors for determining whether or not the plastic is a clear or a colored plastic.

U.S. Pat. No. 4,715,920 to Ruppman, issued Dec. 29, 1987 entitled "Apparatus and Method for Recycling Beverage Containers," discloses an apparatus for recycling plastic beverage containers. This patent recognizes that the base of certain plastic containers may be made of a material different than the body.

U.S. Pat. No. 4,265,170 to Schulze, Jr., issued May 5, 1981, and entitled "Solenoid Actuated Container Crusher" discloses a recycling machine that includes solenoids for crushing containers, end-to-end, using a moving head and a stationary anvil. The machine also includes storage for crushed cans and a magnetic metal and glass rejecter, with an overweight can rejecter when used for aluminum.

U.S. Reissue Pat. No. 27,643, issued May 8, 1973, to Meyers entitled "Process and Apparatus for Collection of Metal Containers" disclosed a recycling apparatus in which containers are moved along a trackway, and non-magnetic containers are gravitationally separated from the trackway. The separated containers are crushed, stored and a token is automatically dispensed, while magnetic containers are separately stored.

Despite these numerous efforts directed to facilitating the recycling of beverage containers, there is an immediate and pressing need to provide a relatively compact, convenient and government certifiable recycling machine that is able, at one location and in one system on a stand-alone, automated, and unmanned basis, to reliably receive and crush beverage containers, regardless of their size and whether the containers are made of metal, plastic, glass or some other distinguishing material.

THE INVENTION

Objects

It is among the objects of this invention to provide an integrated recycling coin and coupon vending machine having a series of modular components which are interlinked in a variety of ways: mechanical, electrical, photo-optical and fluidic.

It is another object of this invention to provide a beverage container recycling machine which can accept a heretofore unprecedented variety of beverage or other containers including aluminum, bi-metal, plastic and glass beverage containers, and distinguish them from unacceptable objects and pay the appropriate scrap or state mandated redemption value to the consumer after acceptance of the containers.

It is another object of this invention to provide an improved beverage container recycling machine which is adjustable in its features to permit acceptance of additional types of containers in the future, and to provide for appropriate changes in scrap or state mandated redemption values for different types of containers.

It is another object of this invention to provide improved crushing systems for recycling machines.

It is another object of this invention to provide more efficient crushing to permit a greater density of crushed materials so that storage bins employed in conjunction with recycling machines are able to accept greater numbers of containers thus requiring less frequent servicing and collection.

It another object of this invention to provide coin dispensing assemblies for recycling machines which are able to handle the very large quantities of coins required for unmanned automated vending machines.

It is another object of this invention to provide a special closed-loop air system which functions not only as an air classifying system, but also as a discrimination and rejection system.

It is another object of this invention to provide special security, safety and sensor systems which will prevent fraudulent redemption and permit discrimination of different types of beverage containers over a wide variety of weights, sizes (in all dimensions) and colors of multi-material type of containers such as bi-metal, bi-plastic, and various multi-colored glass and plastic containers.

It is another object of this invention to provide special beverage container handling systems within the recycling machine to prevent misalignment of the beverage containers prior to crushing, and to prevent damage to the crushing mechanism through improperly sized, improperly weighted, improperly oriented and dirty containers in the system.

It is another object of this invention to provide a system for discriminating between bi-metal vs. aluminum beverage containers, and to make determinations whether the container should be crushed or not crushed, and to pay appropriate values.

It is another object of this invention to provide a recycling system which can be remotely controlled by computer to vary the redemption values vended by the machine including cash, promotional items such as coupons, discounts, and promotional games, sweepstakes entries, premium items and the like.

It is another object of this invention to provide a remotely controllable recycling and vending machine which is computer controlled and completely automated, and which is simple to service and reliable in its operations.

Still further objects will be evident from the descriptions and drawings in this case.

BRIEF DESCRIPTION OF DRAWINGS

The invention is described in more detail by reference to the drawings in which:

FIG. 3a shows in schematic section view the operation of the safety stops associated with the receiving cradle;

FIG. 5a–5d are views of elements of the metals crushing module exploded from FIG. 5, with FIG. 5a being one of the jaws of the crusher in perspective, FIG. 5b being a side elevation of the jaw of FIG. 5a, FIG. 5c being a vertical section along the line 5c–5c of FIG. 5b, and FIG. 5d being a perspective of the trap door;

FIG. 13 is an isometric perspective view of the coin dispenser assembly;

FIG. 13a is a partial section view of the piggy-back coin hopper assembly of the coin dispenser along lines 13a–13a of FIG. 13; and FIG. 14 is an isometric projection of the printer module, the dispenser slot, and the MPC and on-board computer modules.

SUMMARY

Figure 1:
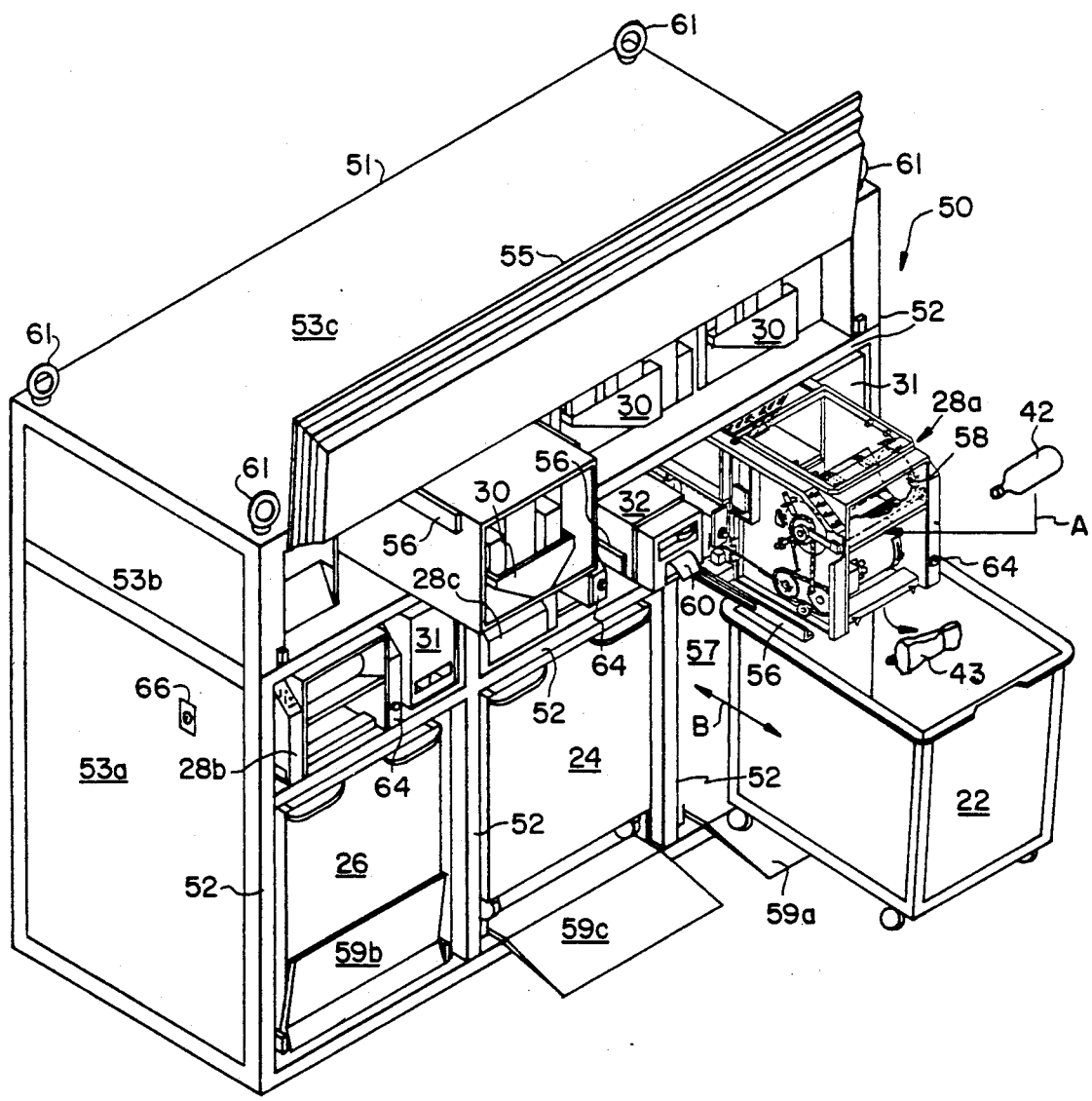
FIG. 1 is a perspective view of the integrated, remotely controllable, automated recycling and vending machine of this invention showing various modules extended on their roller slides for adjustment or servicing.

The invention comprises an automated, stand-alone, unmanned recycling and vending machine for recycling used beverage containers, typically those beverage containers which are the subject of "bottle bills" which provide for return of redemption value upon recycling of the used beverage containers. The recycling machine comprises a series of interrelated modules having means for receiving, sensing, classifying, segregating and/or rejecting various types of containers, and collecting them in special bins in either crushed or non-crushed form. Simultaneously, the information relating to the cans deposited by the consumer is evaluated in an on-board microprocessor controller MPC and/or computer OBC, the values totaled, and appropriate redemption values paid to the consumer in cash, script or tokens.

In addition, an on-board coupon printer, which may be remotely controlled, prints various incentive coupon items which may include various types of discounts and prizes such as cents-off coupons, saver ("bonus") stamps, premiums, promotional game coupons or tickets, and/or sweepstakes entries and the like which may be redeemed by the consumer in grocery or other types of stores in the area. Preferably the machine is located adjacent a food or other store. In a preferred embodiment, when the coupons are redeemed in the stores, they are read by a bar code scanner in the store and canceled, and the information provided to the on-board computer via data link. This information is then collected and forwarded to a remotely located pod computer and/or to a promotional sponsor so that substantially instantaneous evaluation of consumer response to the offered consumer promotion may be obtained and the various promotional offers tailored to the demographics, season, target market, area etc. in which the recycling machine is located.

The modules of the machine include a special plastics crusher/shredder module and its associated collection bin, a glass crusher module and its associated collection bin, and a metal crusher module and its associated collection bin controlled by an on-board microprocessor controller (MPC). The crushing modules have improved crushing features so that there is a substantial improvement in volume reduction. Thus, a greater number of cans and bottles can be accepted and stored in reduced volume form in the collection bins so that there is no need for an on-site operations person and the collection of the crushed materials for recycle is less frequent than in prior recycling machines of this kind.

Further, the collection bins are adapted to be separable from the crusher and coupon printer modules, and are also separate from the coin dispenser modules so that each function is handled separately. That is, a hauling service can access only the collection bins and remove the bins, emptying them or replacing them with fresh bins. Each of the access panels to these bins may be separately locked so that the hauling service has no access to the separate crusher, coupon printer or coin dispenser modules. A separate armored car coin-handling service may be employed to service and refill the coin dispensers. The coin dispensers are located behind a separate panel area, the upper panel area, and the hauling and other service personnel have no access to the coins located in the coin dispensers. Typically, the machine when full will contain several hundreds or thousands of dollars worth of coins so that extensive security is necessary to prevent tampering or theft.

Still a third service organization can be used to provide maintenance, adjustment or replacements for the crusher modules, MPC, OBC and coupon printers. Again, the panels giving access to these special modules may be separately keyed so that only the appropriate personnel have access to them. The coin dispenser modules conveniently may have count or remaining volume sensors associated therewith which are linked to the on-board computer. When the coin supply becomes low in one or more of the modules, the on-board computer can automatically dial out, sending a signal to the armored car service to resupply the coin dispenser modules.

The automated, integrated, modular recycling and vending machine of this invention contains a variety of important additional features including the following:

To insure reliability without the presence of operating or service personnel, all of the switches within the machine are proximity switches rather than mechanical switches which wear out much too fast considering the vast numbers of beverage containers which are recycled in such types of machines.

The crushers are solenoid operated rather than being hydraulic, pneumatic, screw type ram crushers, or gear crushers. This provides for easy adjustability of the crush stroke. In addition, to prevent a hammering effect, the solenoid operation is electrically pulsed so there is a smooth and even stroke. Further, the crushed container size (thickness in the case of cans and large plastic bottles, and the cullet size in the case of glass containers) is easily controlled by the crush chamber size and stroke. One serious disadvantage of prior types of crushers is that in the case of glass cullet they tend to produce too many fines. These fines are easily airborne and can collect in the crusher and cause clogging and abrasions of the crushing mechanism and other sensitive electrical and electronic mechanisms of such machines. In addition, the production of too high a percentage of fines produces a fugitive dust problem which is of serious air quality concern.

The greater density produced by the more complete crush of cans and plastic bottles, and control of cullet size in the case of glass, means that the bins can contain far more containers. For example, in the case of beverage cans, one of the three 36 cubic foot bins of the machine of this invention at 25 pounds of cans per cubic foot will hold up to about 25,000 cans where all cans are crushed. Other machines hold from three to four pounds per cubic foot, and still others collect only 54 pounds of crushed cans in nine to twelve cubic feet. Glass is reduced to 75 pounds per cubic foot, a maximum of 2700 pounds.

In addition, each crusher module is designed to address the distinctly different problems of crushing the different types of materials, the large plastic two-liter bottles as compared to the glass, and as compared to metal cans. In the case of the large plastic bottles and glass, the crushing is parallel to the axis of the container, a lateral crush, whereas the crush in the case of cans is axial can crushing. That is, the crushing force is applied transverse to the axis of the can. In addition, special release bars are provided in the metals crusher jaws to overcome the problem of sugar and other food waste building up on the crusher jaws causing the cans after being crushed to stick to the face of the jaws thus causing jamming. The crusher jaws in the glass crusher module are specially designed with opposed jaws having crush members perpendicularly oriented with respect to each other so that the glass bottles are held in position while they are being crushed. In addition, special ribs in the glass crush jaws provide several thousand pounds per square inch of crush force. Each crushing module is self clearing, and will not function until the container to be crushed is properly oriented in the crush chamber. There is also a discrimination feature of "paying the consumer without crushing" which is particularly useful in the case of discriminating between bi-metal containers and aluminum. Thus bi-metal containers may be accepted along with aluminum containers in a single crusher module, and it is simple to sort the bi-metal containers magnetically from the crushed aluminum since they are not crushed.

Regarding the pay features, there are simple high/low value adjustments so that as the redemption value changes from time to time by statute or regulation, the numbers and types of coins dispensed by the coin hoppers may be easily adjusted without having to redesign or replace the coin hoppers and feeder mechanisms. The pay system is designed to offer payment in appropriate increments, for example, as set up for the current California redemption value AB2020 Bottle Bill, the system accumulates 2.5 cents and then pays upon reaching 5 cents. This is called a "pay 5 cents, carry 2.5 cents" system. If the consumer only puts in one container, and no others, then either by a timing mechanism or upon the consumer pushing the "end of transaction" button, the consumer can be paid appropriately. Pursuant to statute and regulation, the machine need only pay in round cents and thus pays two cents. At the same time the machine provides valuable consumer incentive coupons. The coin hopper modules are non-weighted coin hoppers. The large quantity of coins used would be so heavy as to cause belt-type coin mechanisms to malfunction under the weight of the coins supported on the belt. The coin hopper feeder mechanism of this invention includes a special, two-hopper system in which a first hopper feeds to the second coin feeder hopper so that the coin feeder hopper is never overloaded.

The invention includes extensive sensor systems, both capacitance type sensors and photo-optical type sensors for determining the approach, presence, size, dimension, color and type of container. In addition, mechanical systems provide weight sensing. All of the mechanical operations and sensor systems are completely adjustable. For example, a series of trap doors and pusher doors ("slam-dunk doors") are adjustable and spring biased to provide weight and object sensitivity. The trap doors may also be apertured (X-met) and/or shorter than the crush chambers to permit crushed cans and cullet to fall through so as to prevent jamming. The trap doors are preferably made of X-met to prevent trapping misaligned bottles, and to permit appropriate airflow patterns to be established. The sensors may also be employed to prevent a payment to the consumer in the event of fraud, mistake, or tampering with the machine. The sensors are integrated into a constant, self clearing mode for each cycle of the machine. The sensors are also integrated with a variety of security and safety features preventing tampering by the consumer or service personnel in areas in which they are not permitted, and to also provide for safety so that consumers or others do not injure themselves. Thus for example, the force of a child's hand can stop the container receiving cradle from rotating closed so that a child's fingers are not injured by rotation of the container cradle upon receipt of the beverage container.

The air streams are used in a closed loop air system which reduces the horsepower required. In addition, the air direction is carefully controlled and easily adjustable to compensate for differences in altitude. For example, at the altitude of Denver, the air handling system which classifies the plastic beverage containers in the plastic crusher module is set at a different, more vertical mode than at sea level, say in the Los Angeles area. In addition, there is a reverse use of air in the different crusher modules. Air is used to classify and transport plastic containers in the plastic crusher; in contrast, air is used to reject the glass crusher module. The air ducts are accordion-type ducts which travel upon sliding the modules in and out of the unit so that the air ducts need not be disassembled to service the machine.

A special elevator grid is used in the glass crusher module to insure that tapered glass bottles are properly moved into the crusher chamber. For sensitivity control to discriminate between various weights and/or containers misaligned in the crush chamber the slam-dunk doors and the trap doors in each of the crushing modules are gravity down and mechanically lifted rather than vice versa. This permits precise weight sensitivity adjustment.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

Overall Machine

FIG. 1 shows in isometric projection, the automated recycling and revending machine of this invention having frame-and-panel construction, frame members 52 and panel members 53 respectively. Shown are side panels 53a and 53b and top panel 53c. Not shown in FIG. 1 are the front panels behind which are located the three collector bins 22, 24 and 26 for plastics, metals and glass, respectively and the panels 76, 276 (see FIGS. 3, 7 & 10) which cover the crusher modules 28a through 28c and coupon printer modules 32, and the panels which cover coin token dispensing assemblies 30. It should be understood that the front panels enclosing the crusher modules and coin/coupon dispenser assemblies have a series of appropriate apertures 73, 273 (see FIGS. 3, 7 & 10) therein through which the consumer introduces the beverage container 42 into the crusher module, and subsequently receives coins from the coin dispenser coupon dispensing slot assembly 31. Coupons are also dispensed from printer 32 through an appropriate slot in assembly 31. Additionally, an aperture may be provided in the front panels for an "end transaction" button 64 associated with each of the crusher modules.

The upper panel 55 is conveniently hinged with a piano type hinge along its upper edge so that it may be raised as shown in FIG. 1 to provide access to the coin/token dispenser modules, various fans and other equipment such as environmental control units (air fresheners, air conditioning and handling apparatus, and apparatus for control of pests, mildew, fungus, bacteria and like). Preferably the upper panel 55 and upper end or side panels 53b are box-type panels raisable elecromechanically as by a garage door opener (not shown) Preferably these box panels contain transparent or translucent fronts on which various information is printed with a source of illumination (such as fluorescent tubes) behind it to provide illumination for the consumer during evening and nighttime hours. A common type of front which may be used is a "translite" which may also contain a picture and other promotional information. The front panels may also conveniently contain instructions and other types of notices on opaque signage. Typically, the interior of the housing contains environmental insulation, including thermal and sound insulation. The exterior of one or more of the panels may include non-mar surfaces. Typical dimensions for the housing are on the order of eight feet high and ten feet long and four feet deep. The unit is connected to a source of electrical power and data links (not shown).

The various control functions and connections to the remotely located pod computer 16, pod central computer 12 and coupon distributor computers 14 have been previously described in the aforementioned copending serial number 462,394, the disclosure of which is incorporated herewith by reference. Likewise, the use of input data from one or more bar code scanners 40 via multiplex collector 38 (for the bar code scanners) is fully described in serial number 462,394. The on-board computer 18 may communicate via modem 34 with the various remote external computers and data inputs by any convenient transmission means and/or hard wire. The on-board microprocessor controller 20 (MPC) functions to control the various operations of the mechanical modules described herein.

Figure 1A:
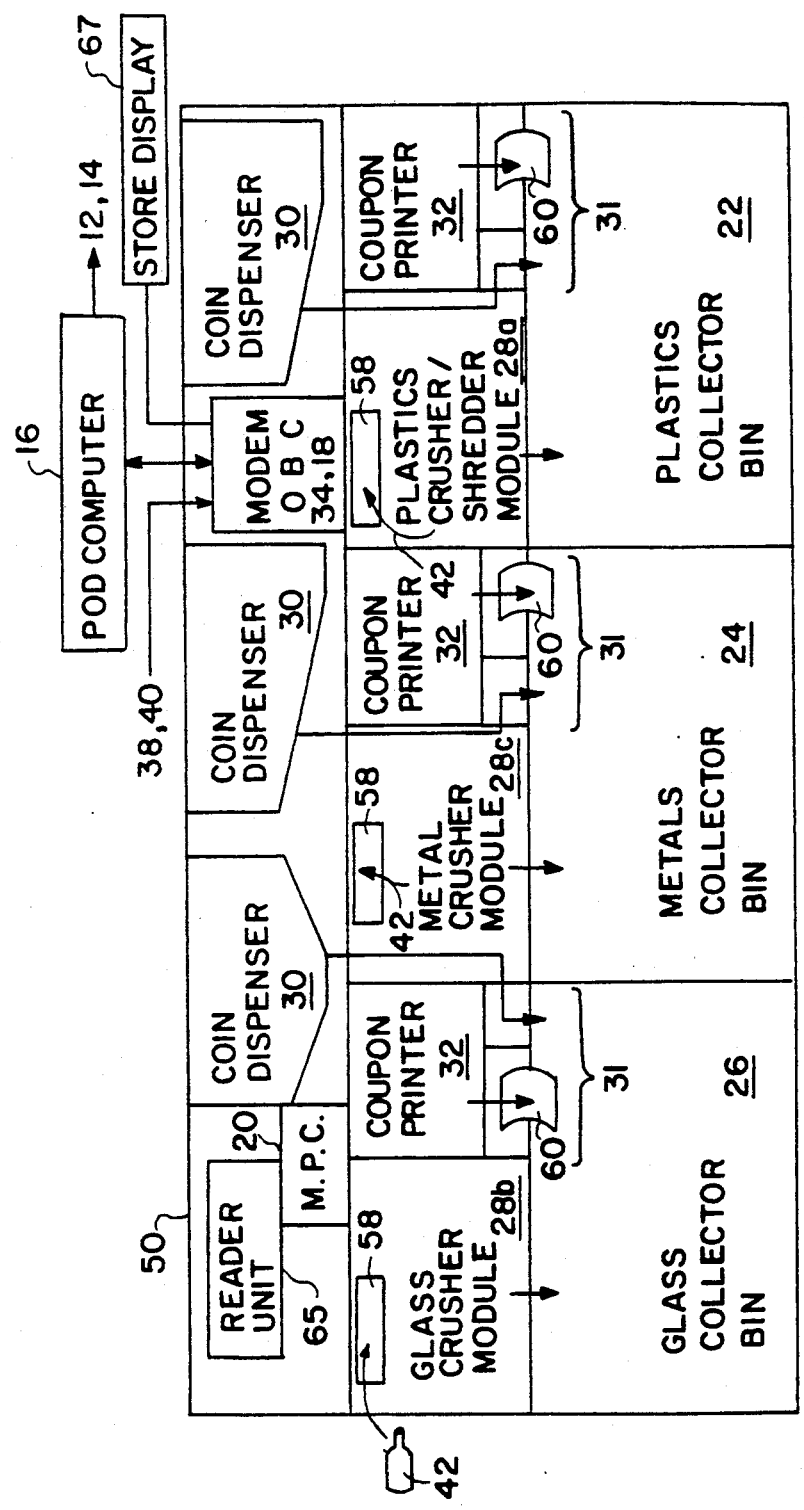
FIG. 1a shows in schematic the interrelationship of the various modules of this invention.

Referring now to both FIGS. 1 and 1a, the latter shows in schematic the various modules of the automated recycling and vending machine 50. The machine comprises three basic crusher modules, a plastics crusher/shredder module 28a, glass crusher module 28b and metal crusher module 28c. The consumer introduces a beverage container 42 into the receiving cradle 58 of a crusher module 28. Assuming for the moment the beverage container is an appropriate container, the module senses, discriminates, sorts and crushes the container, dropping it into the appropriate collector bin, plastics collector bin 22, metals collector bin 24, or glass collector bin 26, as the case may be, located just below the crusher module. On sensing and detecting a container of the appropriate size, weight, material type, and/or color of container, the coin dispenser 30 then dispenses the appropriate redemption value to the consumer via the dispensing slot assembly 31. At the same time, coupon printer 32 may be programmed to print and distribute via the dispensing slot assembly 31, a one or more part coupon. "Coupon" is broadly defined herein as in serial number 462,394 to include any type of promotional item, and is preferably a three part coupon including some sort of a discount coupon such as a cents-off coupon, a rub off game token and/or a sweepstakes entry, and a saver or bonus stamp (proof of recycling stamp).

As shown in FIG. 1, the various modules are mounted on slides 56 so that they may be pulled out for easy access for adjustment, servicing or replacement. As shown in FIG. 1, the plastics crusher module 28 is pulled almost all of the way out, while the printer module 32 associated with the metals crusher module 28c is pulled out only part way, and the coin/token dispenser 30 associated with the glass crusher module 28 is pulled part way out. It should be understood that even though each of these modules or assemblies are mounted on slides, they also include locking positions to lock the modules in their operative position within the machine to insure that there is appropriate alignment between the related modules and to prevent damage during shipment, operation or servicing.

In addition, the crushed plastics collector bin 22 is shown being pulled out of its receiving position 57 via at the ramp 59a. Note the ramp stays with the machine, in that it may be pivoted up out of the way as shown by ramp 59b so that the appropriate front panel may be secured over it. Ramp 59c is shown in its deployed position before removing the metals collector bin 24.

In operation, the consumer approaches the machine, follows the instructions by placing the appropriate container in the appropriate crusher module through the entry slot into the receiving cradle. The machine then processes the container, determining its composition, size, weight and/or color, classifies the container, and if appropriate, crushes it, depositing the crushed remains in the appropriate bin. If the container is improper, the machine then rejects the container but does not pay or return it to the consumer, and does not dispense a promotional coupon. If the proper container is redeemed, the machine will then match the sensed information relating to the container to the preprogrammed container value and cause the coin dispenser to issue the appropriate coins or tokens to the consumer in accordance with the state-mandated redemption value or scrap value. In addition, the coupon printer prints appropriate information on the multi-part coupon and dispenses it to the consumer.

Various sensors are provided as will be described in more detail below to satisfy the discrimination and classification functions. In addition, there are a number of photo-optical, electronic and mechanical systems to prevent anyone from injury upon attempting to put their hands into the machine and/or vandalize or sabotage it, or to attempt fraudulent redemption with non-redeemable containers or other objects. Heretofore, other recycling machines have not been able to satisfactorily discriminate between the various types of containers, or have become easily jammed with improperly sized, fouled or dirty objects or beverage containers. Further, the property of the machine to be able to produce instantly changeable coupons responsive to the dynamics of marketing variables has not heretofore been obtained by recycling machines as has been more fully described and claimed in system application 462,394.

The housing 51 is environmentally sealed so that the machine is a stand-alone unit that can operate automatically, 24 hours a day without need for the presence of operational personnel. The machine can be lifted as a unit by appropriate tackle engaging the eyes 61 at each of the upper four corners. The machine can be remotely monitored or controlled through data line link via modem 34 to an on-board computer 18 and microprocessor controller 20.

Referring to FIG. 1a the recycling machine preferably includes a reader unit 65 that is accessible upon opening one or more of the panels of recycling machine, such as special key-access panel 66 (in wall 53a). The reader unit 65 may be a bar code reader for reading a pre-determined code. The reader unit 65 communicates with the on-board computer for providing information to the on-board computer, based on the input information read by it.

In one application, a pre-determined code is input into the reader unit by an individual who is collecting the recycled containers from the recycled container bins. That is, at regular intervals or when one or more of the bins are filled with containers, the employee or individual responsible for collecting and removing the containers inputs a pre-determined code using the reader unit 65 to the on-board computer. This pre-determined information is relayed to the POD computer 16, where it is checked or compared with one or more of a number of acceptable pre-determined access codes. If a verification is made between the input code and previously stored expected or acceptable codes, this verification or match results in a transfer, storing or saving of information relating to recycled containers that have been received by the recycling machine since the last determined code was input to that machine. Such information includes the total number of containers received from each of the three modules. Preferably also, for each of the three modules, there is a total number of large containers received and a total number of small containers received. In one embodiment large containers are considered those greater than 24 oz, and the small containers are less than or equal to 24 oz. This saved information can be provided to a necessary or interested party, such as a governmental agency, which monitors such information in connection with the recycling of containers by the recycling machine. As can be appreciated, use of the reader unit 65 initiates an automatic saving and it generates an automatic pre-determined print-out providing the desired information, thereby saving additional time and effort in obtaining such information by manual determination and/or some other less convenient means.

In a preferred embodiment, the recycling machine also communicates with a store display 67 through its on-board computer. A store display is typically placed in a retail outlet, such as a grocery store, which is located near the recycling machine. The store display has changeable message capability and preferably graphics display capability. It communicates with the on-board computer over standard data link using a commercially available modem 34. Since the on-board computer is operatively connected to the POD computer, the POD computer is able to generate and/or send desired information to the store display 67 for display of desired information. In one embodiment, information to be displayed using the store display 67 is part of a data or information file that includes coupon-related data, such as the identity of a product, an amount off the regular price of the identified product and a termination date for the coupon. In such an embodiment, when information to be printed on the coupon is to be changed, the information to the store display unit 67, such as an advertising message, can also be changed on the store display 67. When the new coupon information is transmitted to the on-board computer by the POD computer, the on-board computer is able to select that information for the store display 67 from the input file and cause it to be transmitted to the store display. It should be understood, however, that new store display information need not be sent as part of a file that includes coupon information. Rather, new or updated information to the store display 67 can be provided separate from information used to update coupons.

Crusher Modules

Plastics Crusher/Shredder Module

Figure 2:
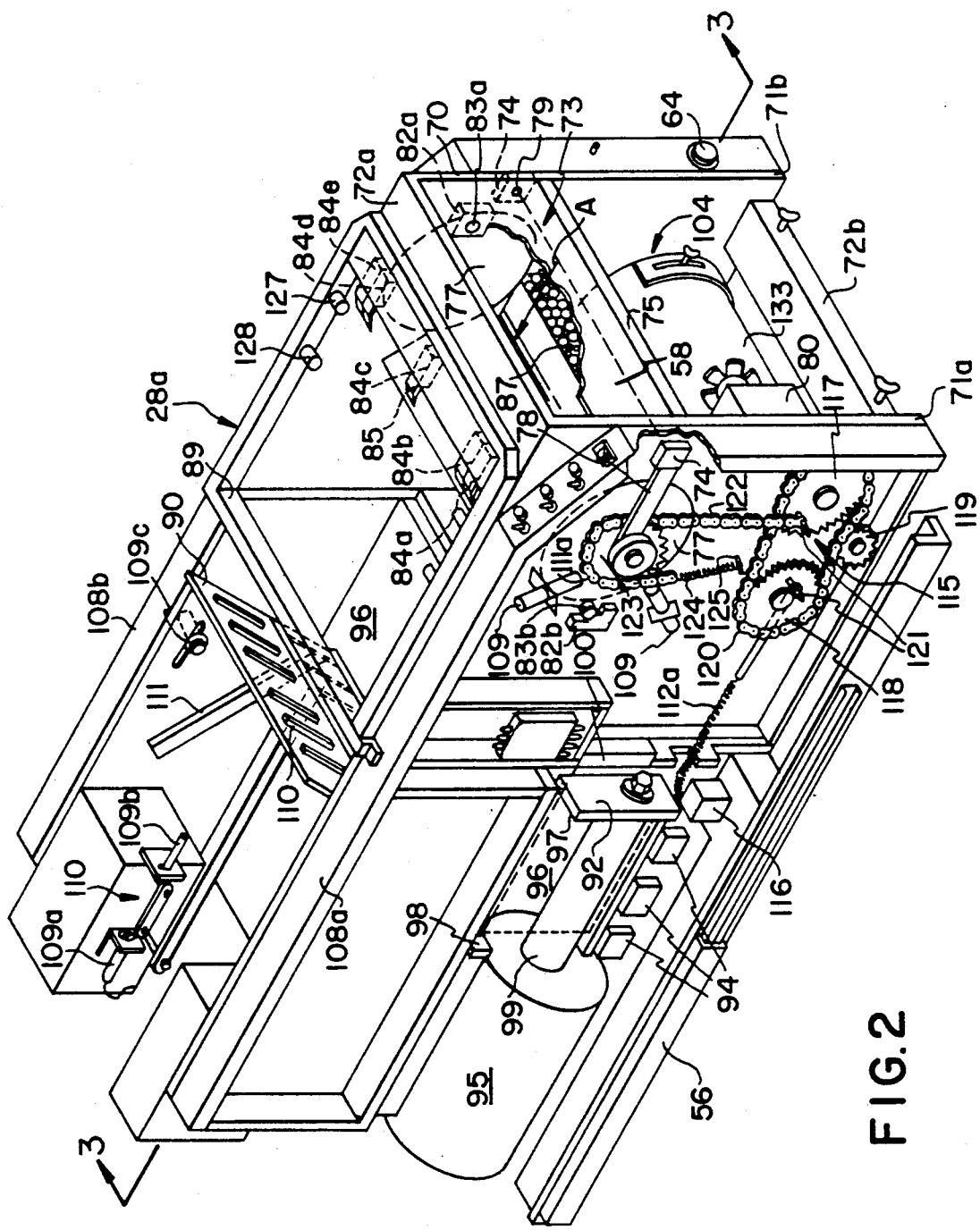
FIG. 2 shows in isometric perspective the plastics crusher module of this invention.
Figure 3:
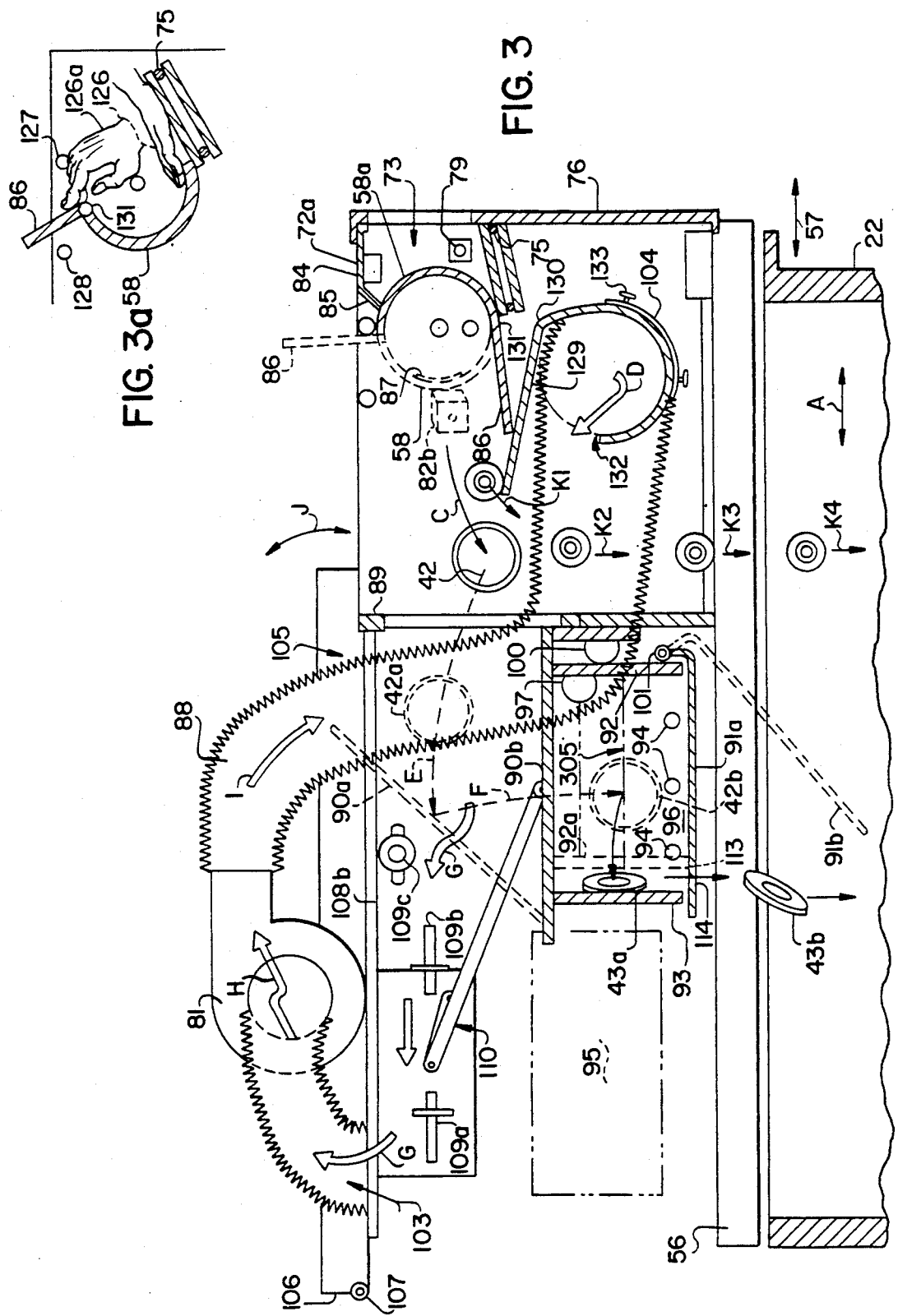
FIG. 3 shows a vertical section view of the plastics module along line 3—3 of FIG. 2.
Figure 4:
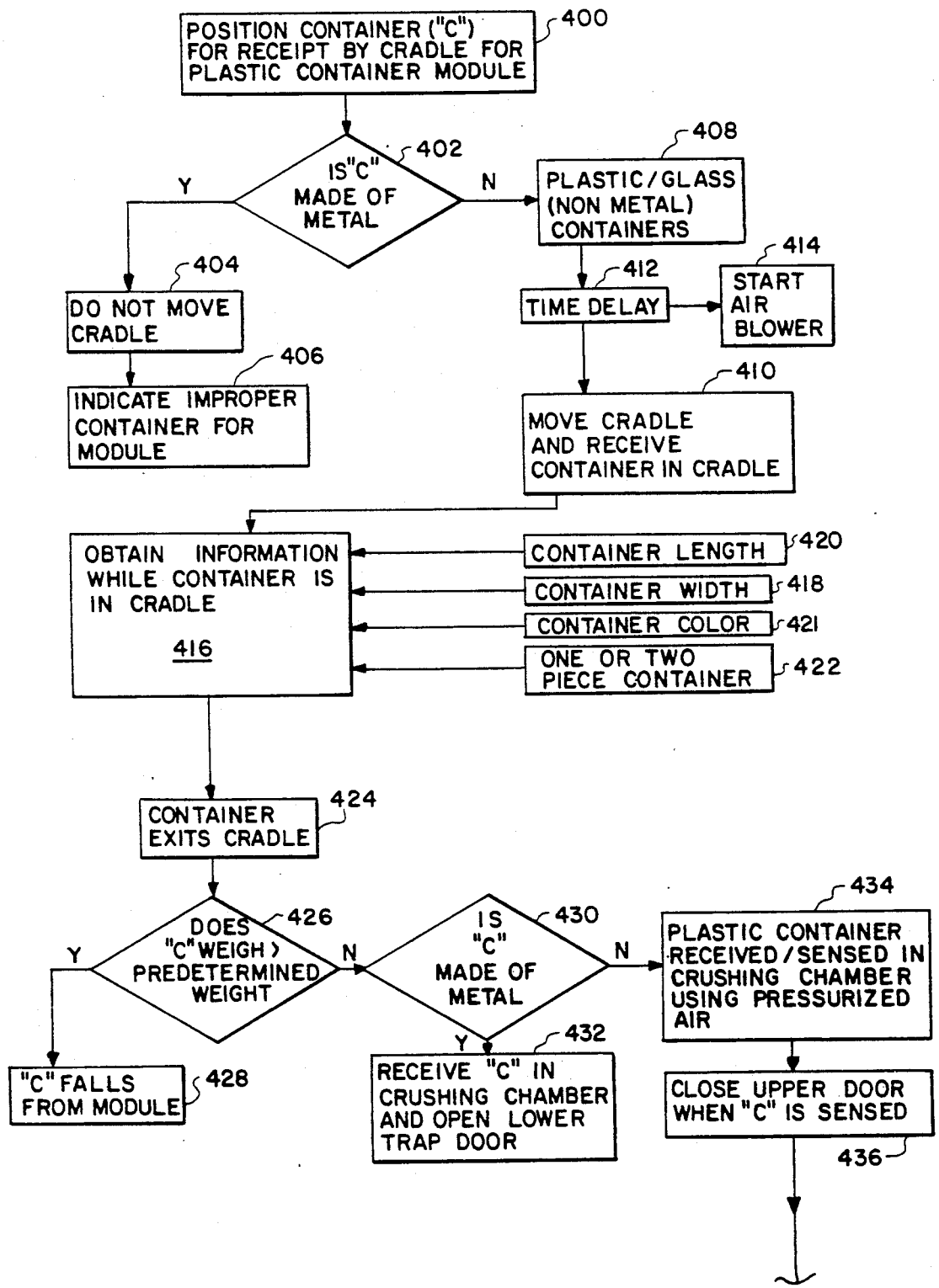
FIG. 4 shows in schematic the operational functions of the plastics crushing module.
Figure 4:
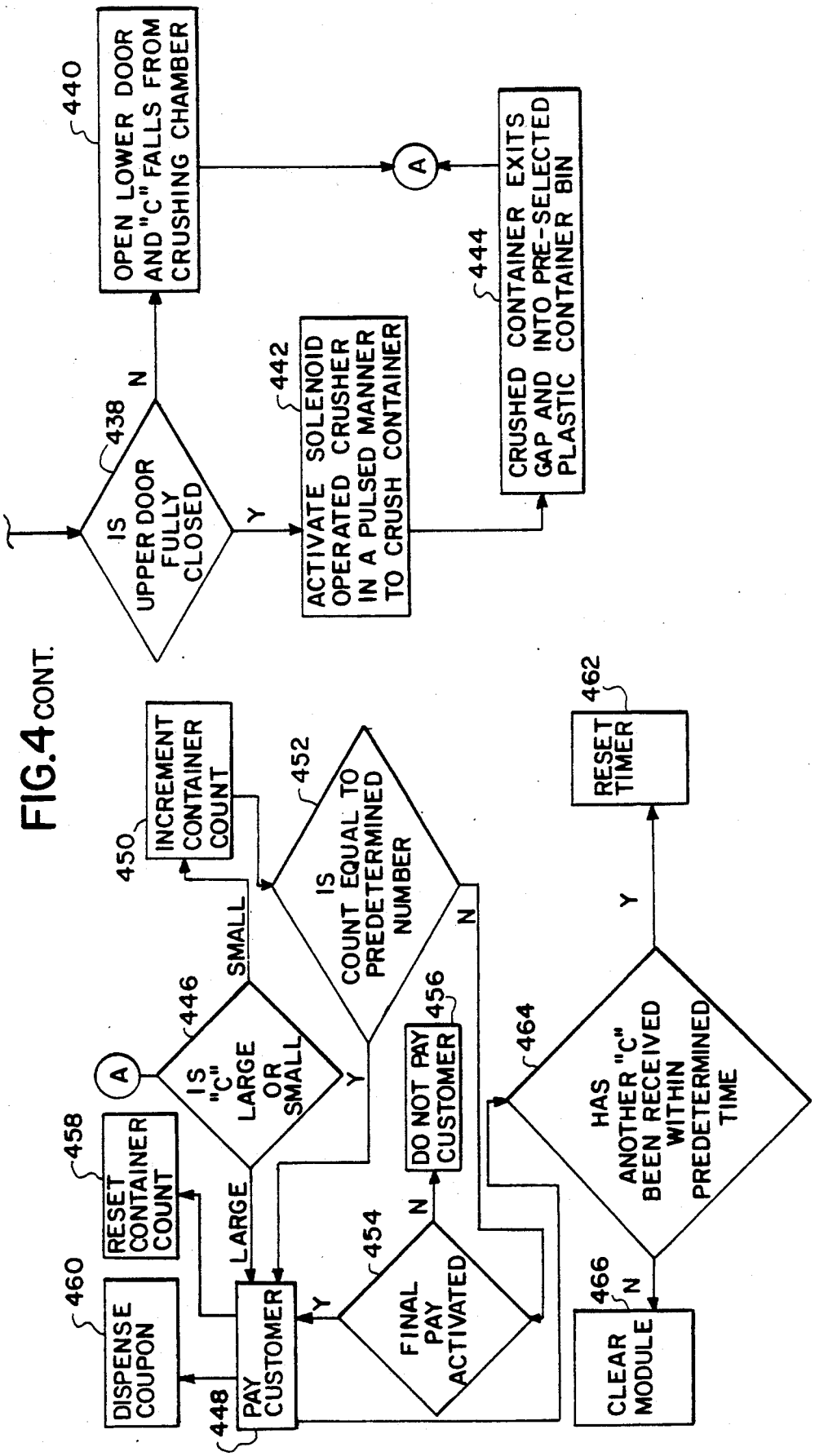

FIGS. 2, 3 and 3a show the plastics crushing/shredder module and FIG. 4 schematically outlines operations. The module comprises a housing 70 which generally includes a pair of spaced, upstanding side walls 71a and 71b into which are journaled or on which are mounted a variety of the subassemblies as will be described in more detail below, and which side walls are cross-braced as appropriate, such as by cross members 72a, 72b and others not shown in these drawings. Additionally, some of the other subassemblies serve not only to perform their own function but also to cross-brace and maintain the side wall spacing of the housing.

Referring to FIGS. z and 3, the consumer deposits a used plastic container 42 (see FIG. 1) through plastics container deposit slot 73 which is defined between the side walls 71a and 71b, the upper cross brace 72a and metal detector 75 which is positioned at the entry. Introduction of the container is shown as arrow A in FIGS. 1 and 2. The slot 73 is defined in the stainless steel cover panel 76 as shown in FIG. 3. The receiving cradle 58 is in the fully closed position as shown in solid lines in FIG. 3 and is denominated 58a. That is, the consumer sees the solid bottom surface of the receiving cradle which is a hemi-cylinder having circular ends 77 journaled in brackets 78 secured to the side panels 71a and 71b respectively. This is best shown in FIG. 2. Upon passing the bottle into the slot 73, the bottle interrupts the infra-red entry detector 74 which looks through a hole 79 placed intermediate the entry slot 73 and the position of the cradle 58. It also passes over metal detector 75, the upper surface of which is sloped slightly downwardly from front to back to permit a shorter person to place the bottle at the entry lip and let it roll downwardly toward the cradle. If the entry detector 74 detects the presence of an object by interruption of the infra-red beam, and the metal detector 75 detects that the object is not metal, then the cradle 58 is rotated by motor 80 to its open position as shown in dashed lines in FIG. 3. It is preferred that blower 81 starts immediately upon the entry detection so that there is sufficient air pressure built up in the system before the cradle reaches its open position. The cradle does not pause for any extended length of time. Rather it opens momentarily and closes continuously so it accepts only one container at a time. This serves as a counting function. However, since the drive system is spring biased, if a person attempts to stop the rotation with the hand 126 (see FIG. 3a), or the person's hand is caught in the cradle, the cradle will not continue to close. Only light finger pressure need be applied to prevent the cradle from closing. Since the object in the cradle is an empty beverage container, the power to rotate the cradle is made minimal for safety reasons. As the cradle rotates, the round beverage container in the cradle counter-rotates and stays in position in the bottom of the cradle.

Once the beverage container is in the cradle, then a series of sensors providing information for the "pay matrix" comes into play. The object's height (diameter) and length are both sensed. The height is sensed through height sensor system 82/83 best shown in FIG. 2. The emitter/receivers 82a, 82b pass/receive an infra-red beam diagonally across the approximately vertical mid-point of the cradle through holes 83a, 83b, placed appropriately in the end wall 77 and/or the sidewalls 71b and 71a. The diagonal beam path is provided to sense across the entire width of the cradle, and one or more of the emitters/receivers 82a, 82b are vertically adjustable for height (diameter) of the container. The length of the object is sensed by a plurality of sensors 84a through 84d, best shown in FIG. 2. These sensors may be shielded by finger flanges 85, so that hinged flap 86 does not damage them. These sensors look downwardly on to reflector tape 87 which extends across the full width of the entry slot (the full length of the hemi-cylindrical cradle 58). Depending on the number of beams reflected, the length of the object can be determined. Likewise, if the height sensor system beam is interrupted, it can be determined that the object has a larger diameter than if the beam is visible. From this, the payout to the consumer can be determined, for example five cents for a large 2-liter plastic bottle, and 2.5 cents for a smaller plastic soda pop bottle.

Upon rotation of the cradle 58 back to the position shown in solid lines in FIG. 3, the container 42 rolls backwardly and downwardly into the machine as shown by arrow C. There, air, as best shown by arrow D, applied by fan 81 through 8-inch accordion-type polypropylene plastic ducting 88 blows the plastic bottle 42 through a loop-type metal detector 89 into contact with a slotted "slam-dunk" door 90 which deflects the container 42a as shown by arrows E and F, downwardly into the crusher chamber 91 as shown by the container 42b in phantom. The container rests on the hinged trap door 91 which is shown at 91a in its upward or closed position. The container is thus trapped within a crush chamber "box" 305 (FIG. 3) defined by the side walls 96, the slam-dunk door 90 in its lower position 90b, the trap door 91 in its upward position 91a, and at the front and back by the moveable front crusher jaw 92 and the rear fixed jaw or anvil 93, respectively. Upon the container being sensed by a crush chamber presence sensors 94 (as best seen in FIG. 2), the spaced solenoids 95 (one on each side of crush chamber 305) reciprocatingly retract the front, moveable crusher jaw 92 backwardly toward the fixed anvil 93 to the position shown as 92a in FIG. 3, thereby crushing the container laterally, that is, parallel to the long axis of the container to a dimension of no more than about ½ inch.

It should be understood that attached to the front jaw 92 are slidable side plates 96 which define the two sidewalls of the crush chamber 305. These reciprocate with the moveable crusher jaw 92. The rear fixed crusher anvil is inset within the space defined between the two side plates 96. The crusher jaw 92 has a pair of side bumpers 97 (best seen in FIG. 3) which contact stop 98 (best seen in FIG. 2) to prevent retraction over-travel of the plunger rod 99 by the solenoid 95. Likewise, there are a pair of bumper assemblies 100 attached to the side walls 71a and 71b to prevent over-travel of the plunger rod on the extension part of the solenoid stroke.

The trap door 91 is hinged at its forward end independently of the jaw 92 on transverse cross-bracing rod 101 as best shown in FIG. 3. The trap door is preferably made of expanded metal (x-met) of sufficiently small mesh to prevent the necks of small bottles from catching in the apertures, yet having a sufficient number of apertures to permit air to flow therethrough. In addition, the slam-dunk door 90 is slotted as shown at 102 to permit air to pass therethrough back to the intake 103 of the closed-loop air handling system. As shown by arrow G, the air travels back through the slam-dunk door into the intake end 103 of the air handling system from which it thence passes as shown by arrow H into the intake side of the fan 81. The air is then recirculated as shown by arrows I and D back to the air deflector assembly 133 which may be angularly adjusted for the reasons described in more detail below by means of the pins and slot system 104 best shown in FIG. 2.

As shown by arrow J, there is an upper air manifold assembly 105 which comprises a tray 106 which is hinged at its rear by a pivot member 107 which seals across the side flanges 108a and 108b to ensure that there is a good air seal. This permits recycling of the air used to transport the plastic bottles from the receiving cradle to the crusher chamber, thus reducing the horsepower and energy requirements of the system.

A series of proximity sensors 109a,b,c, which detect the position of the crank mechanism 110 for the slam-dunk door, and the lower position of the slam-dunk door as defined by the travelling arm 111, provide an anti-jamming/sensing feature. If the slam-dunk door does not go all the way down to the position shown by 90b in FIG. 3, then the trap door can be opened by gravity release of chain/spring mechanism 112 (as seen in FIG. 2).

Both the trap door and the slam-dunk door are "gravity-down/power lift" with spring override. As shown in FIG. 3, when the container is crushed 43a, it can then fall downwardly through the slot provided between the rear end 113 of the trap door and the rear crusher jaw 93. This gap is approximately 1½ inch and will easily permit the crushed container to fall downwardly through the gap upon release of the crusher jaw 92 by the solenoid 95. However, if the crushed container is not released or it sticks to the front plate or is deposited on the upper surface of the trap door 91a, then upon the rotation of the cradle 58 to the open position, the trap door will open and clear itself by the chain driven power mechanism 115 as best shown in FIG. 2. To prevent the trap door from rising too high, widely space finger stops 114 are provided projecting from the rear end 113 of the trap door 91a. The trap door 91a is lifted by the chain lift system 112 with its spring override. The spring is provided so that if there is an over heavy object on the trap door, its weight will override the upwardly lifting force of the chain 112, the spring 112a will extend and the objects will slide off the downward opening trap door into the bin 22 below. The chain 112a passes over a Nylotron bushing 116.

The motor drive system operates as follows. The motor 80 through gear reduction drives a pair of chain-linked sprockets 117 and 118. The spring loaded idler sprocket 119 mounted on a pivoting bracket provides appropriate tension as its vertical position is adjustable. Thus, as the motor rotates the sprocket 117, chain 120 also drives sprocket 118. Rotational motion of the sprocket 118 is translated to reciprocating linear motion by pin and crank mechanism 121. This translates into the up and down motion of the trap door by use of the spring-biased chain system 112. Likewise, t he sprocket 117 contains a pin 121 to which is fastened chain 122 which engages the driven sprocket 123 journaled to the shaft of the receiving cradle 58. The end of the chain 122 is tethered by pin 125 via spring 124. Thus, as sprocket 117 continuously rotates, its rotational motion is translated into pivoting motion of the receiving cradle from the closed position shown in bold in FIG. 3 to the half way position shown in FIG. 2, and then to the fully open position shown in dashed lines in FIG. 3, and back to the original closed position shown in bold lines in FIG. 3. The spring 124 provides for override upon a person putting their hand or something getting jammed in the opening of the cradle.

As shown in FIG. 3a, a person's hand 126 stops the rotation of the cradle 58, as the spring 124 as shown in FIG. 2 will provide override of the power closing so that the person will not injure their finger(s) by shearing action of the lip of the cradle passing adjacent the rear edge of the upper plate 72a. In addition, as shown in FIGS. 3 and 3a, a forward stop member 127 causes the hinged flap 86 to fold backwardly, so that it does not engage and damage the sensors 84. FIG. 3a also shows the functioning of rear stop 128. If a person stops the rotation of the receiving cradle with their hand 126, and then attempts to use the other hand 126a to reach into the machine by pushing back on the flap 86, the flap engages the side stops 128. The flap 86 will be prevented from being pushed further backward by the stop 128, thus keeping someone's hands from being injured by the machine, and preventing sabotage or vandalism to the machine.

FIG. 3 also shows the use of the air conveying (airveyoring) system which also functions as an air classification system. As seen by arrow C, the bottle 42 is blown backwardly into the crushing chamber 305 after bouncing off the face of the slam-dunk door 90a. But if a heavier object which is not metal is placed in the cradle, and it looks to be the size of a plastic bottle as sensed by the height sensor system 82/83 and the length sensor system 84, it rolls off the flap 86 as shown in FIG. 3, and thence off the rear edge of the deflector flange 129 as shown by arrow K. Since the object is too heavy to be blown into crush chamber 305 by the air pressure provided, it then proceeds to fall directly down into bin 22 as shown by arrows K2, K3 and K4. This bottle is then separated out by weight, floatation, incline table or other manual or mechanical sorting means at the plastics processing center. Since the bottle is not crushed and remains integral, it is easily separated. In contrast, had it proceeded into the crushing chamber, it would have become crushed and the glass cullet and shards intermingled with the plastic, being caught in the corrugations of the crushed and folded plastic or inside the plastic bottles themselves. Upon the plastic being melted, it would be contaminated, ruining both the melt and the plastics forming equipment. By not crushing the glass bottle, the value of the recycled plastic is retained and enhanced.

Surprisingly, it has been found that the air deflector assembly upper flange 129 should be disposed at an angle to the generally semi-circular deflector cylinder 133 as shown by the angular bend or juncture 130 (best seen in FIG. 3). This introduces sufficient turbulence that the air handling characteristics can be better directed and controlled. Surprisingly also, we have found that the air needs to be directed more nearly upwardly at higher elevations than at sea level. This is provided by the pin and flange system 104 (see FIG. z). As shown, the air deflector is set generally for a sea level installation. For a higher altitude installation such as in the Denver area, the collector assembly 133 would be rotated clockwise along flanges 104 (see FIG. 3) so that the upper flange 129 points more nearly upwardly. Since the flap 86 of the cradle is hinged at 131, the rotation does not interfere with the operation of the cradle assembly 58. It should be noted that the resulting slot 132 is relatively narrow, comprising approximately 45°±10 degrees of arc.

With respect to the operation of the plastic crusher module 28a, reference is now made to FIG. 4, which illustrates cycling-related steps associated with this module. In the discussion which follows, the numbers in parenthesis are references to FIG. 4, while the parts numbers are references to FIGS. 1-3a.

Initially, an empty plastic container is placed (400) in the receiving slot 73. The entry detector 74 senses when this occurs and the metal detector 75 senses or detects whether or not the container is made of metal (402). If the container is made of metal, the receiving cradle 58 remains in position (404) and an indication is provided that the container is not acceptable (406) for recycling in the plastic crusher module 28a. This indication may take the form of an audio signal or an appropriate visual display to the depositing person (consumer). If there is an indication, however, of a nonmetal container (408) by the metal detector 75, this indication is processed by the microprocessor controller 20, which causes the receiving cradle to move or rotate (410) to a container-receiving position 58 (FIGS. 3 and 3a). Before the receiving cradle 58 rotates, there is a short pre-determined time delay (412) to permit the air blower 81 to activate (414) in order to provide pressurized air D (FIG. 3) to the plastics crusher module 28a.

After the short time delay, the receiving cradle 58 is rotated open (FIG. 3) and the container rolls into the cradle 58. Then the cradle 58 reverses rotation during which the predetermined and desired information associated with recycling the container is obtained (416). In particular, the height sensor system 82/83 determines the width (diameter) of the container (418); the length sensor system 84a-84d obtains information for determining the length of the container (420); the "color" sensor system (described below) is used in providing information for determining the color (421), such as whether it is transparent or a colored container; and the composition sensor system provides information as to whether or not the plastic container is homogeneous or whether it is a multi-piece container having a base different from the remaining portions of the container (422). As described below, the 3-eye color/container-type sensors may be ganged in a logic matrix.

After this information is obtained, movement of the receiving cradle 58 is such that the container now exits (424) the receiving cradle and passes in the vicinity of the pressurized air D as it exits the duct 88, 133 and enters the loop 89. In the case where the container is greater than a pre-determined weight (426), it falls from the plastic crusher module (428) into the bin 22. This would occur if, for example, the container were made of glass, which is heavier than plastic containers and the pressurized air is set to not have force sufficient to carry or support the container. The plastic container would also fall, if it were weighted with a liquid or other materials to have a greater than the pre-determined weight.

In the case in which the container is supported and caused to move by the pressurized air, a second determination is made as to whether or not the container is a metal container (430) by loop-type metal detector 89. This check insures that there has not been a substitution of a metal container, after the initial determination that the container in the bin receiving position 57 was not made of metal. If a metal container is detected, after the container is received in the crushing chamber (432), the trap door 91 is controllably opened using the MPC 20. As a result, such a metal container would exit the crushing chamber without being crushed.

Where the container is a plastic container that is not greater than the pre-determined weight, it is sensed when received into the crushing chamber 305 using the force of the pressurized air D (434). When the container is in the crushing chamber 305, the presence sensors 94 detect the presence of the container (434). This information is used by the MPC 20 to control movement of the slam-dunk door 90 from its up position 90a in a direction towards its down position 90b (436). After the slam-dunk door 91 has been caused to move in a downward direction, the inputs from the proximity sensors 109 are checked by the MPC 20 to determine if the slam-dunk door 90 is in a desired or fully closed position (438), before proceeding with the crushing of the container. When the slam-dunk or upper door is not fully closed or in its desired position, as determined using information from the proximity sensors 109, the trap or lower door 91 is controllably opened (440) by the MPC 20 permitting the container to fall from the plastic crusher module 28a into bin 22. In this manner, a container that is received into the crushing chamber such that a proper crushing operation can not be achieved, is released without unwanted damage to the module. However, in such a case, the MPC 20 controls the coin/token dispenser module to dispense the correct amount of coins/tokens and/or coupons to the consumer (448, 460).

In the normal situation where a plastic container has been received by the crushing chamber and is supported on the trap door 91 in proper orientation, the solenoids 95 are activated causing movement of the front moveable crusher jaw 92 whereby the plastic container is crushed (442) between that jaw 92 and the rear fixed crusher jaw (the anvil) 93. The container is sufficiently crushed so that it is of a size less than that of the gap between the rear of the trap door 91 and the rear fixed crusher jaw 93 to drop through the gap into the plastic container bin 22 (444).

At essentially the same time a signal is generated to initiate the crushing operation (442), the MPC 20 makes a determination as to whether or not a predetermined amount of money (coins) or tokens and/or coupons are to be dispensed (448, 460), depending upon the size of the container that is being crushed. In one embodiment, a determination is made as to whether or not the container is a large or small container (446). In making that determination, the MPC 20 uses the container length and container width information previously obtained. For example, if the container is larger than 24 ounces, the coin/token dispenser module 30 is controlled to dispense a nickel (448). For a container that is 24 ounces or less in volume, only one half of the amount for the large container is to be dispensed. Where the amount to be dispensed for large container is a nickel, since one half of a nickel can not be dispensed, the number of small containers is counted (450) until the number of small containers crushed equals two (450), at which time the coin/token dispenser module 30 is controlled to dispense a nickel for the two small containers. In the case where only one small container is crushed or where there is an odd number of small containers, there is a rounding down so that for the odd number of containers crushed, when a final pay or "end of transaction" button 64 is activated by the customer (454), the coin/token dispenser assembly is controlled to only dispense two cents for the odd container (448), and coupon(s) are dispensed (460). If the final pay switch 64 is not activated for a single container input or an odd number of containers, the customer is not paid (456). Each time there is a payment, the container count is reset (458). Preferably, each time a customer is paid, a coupon is also dispensed (460).

In the preferred embodiment, the MPC also monitors a timer, which must be reset otherwise the module will be cleared. The timer is reset (462) by the MPC whenever a container has not been received by the module within a pre-determined time (464). If a container has not been received within such a time period, the module is told to clear (466) by running through a cycle by the MPC 20, wherein the receiving cradle 58, the slam-dunk door 90 and the trap door 91 are caused to move and cycle so that their end positions or states are such that they are positioned for acting when another container is placed at the bin receiving position 73.

Crusher Nodules

Metals Crushing Module

Figure 5:
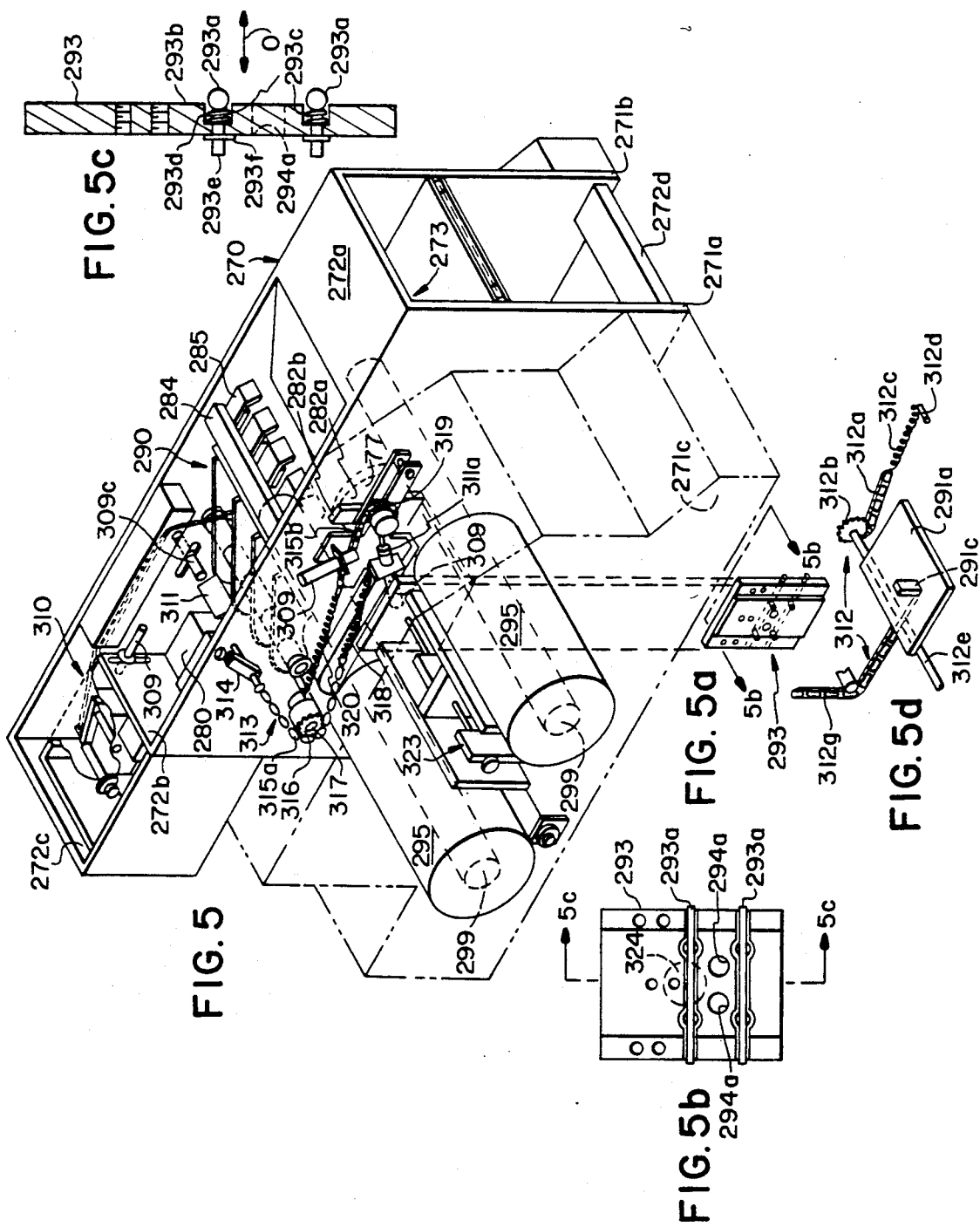
FIG. 5 is an isometric perspective view of the metals crushing module from the left side from the front.
Figure 6:
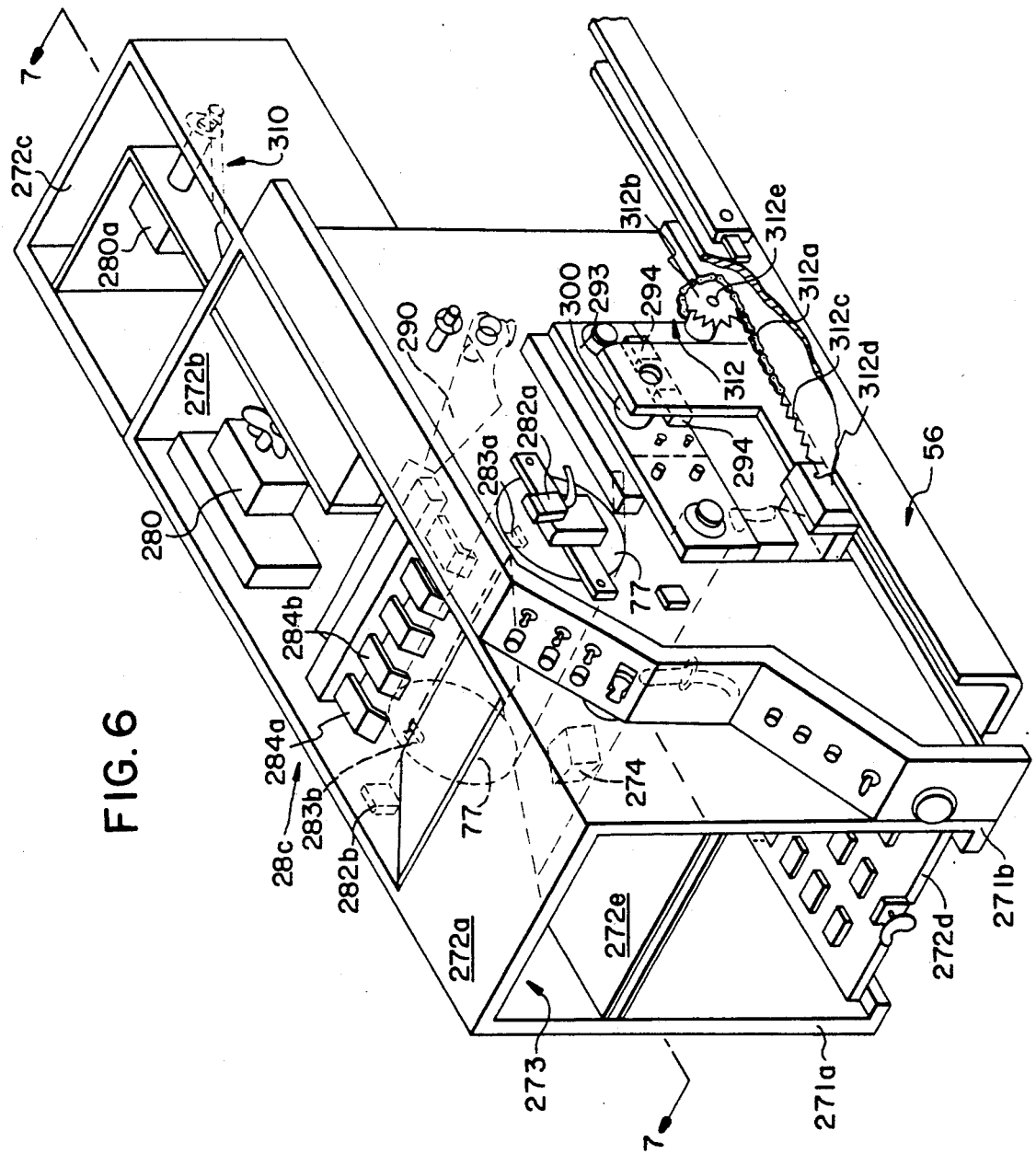
FIG. 6 is an isometric perspective view of the right side of the metals crusher module of FIG. 5.
Figure 7:
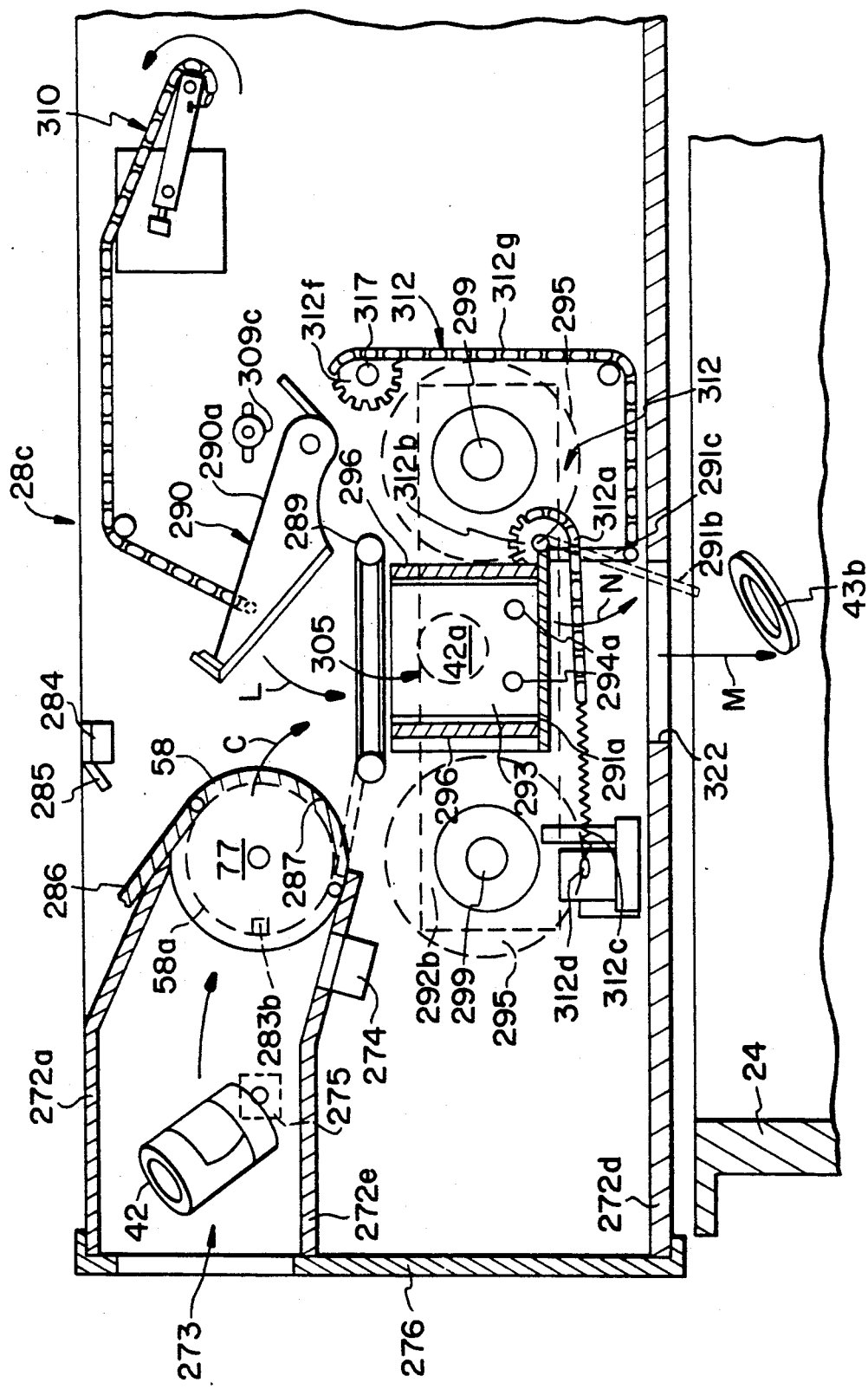
FIG. 7 is a vertical section view along the line 7-7 in FIG. 6.
Figure 8:
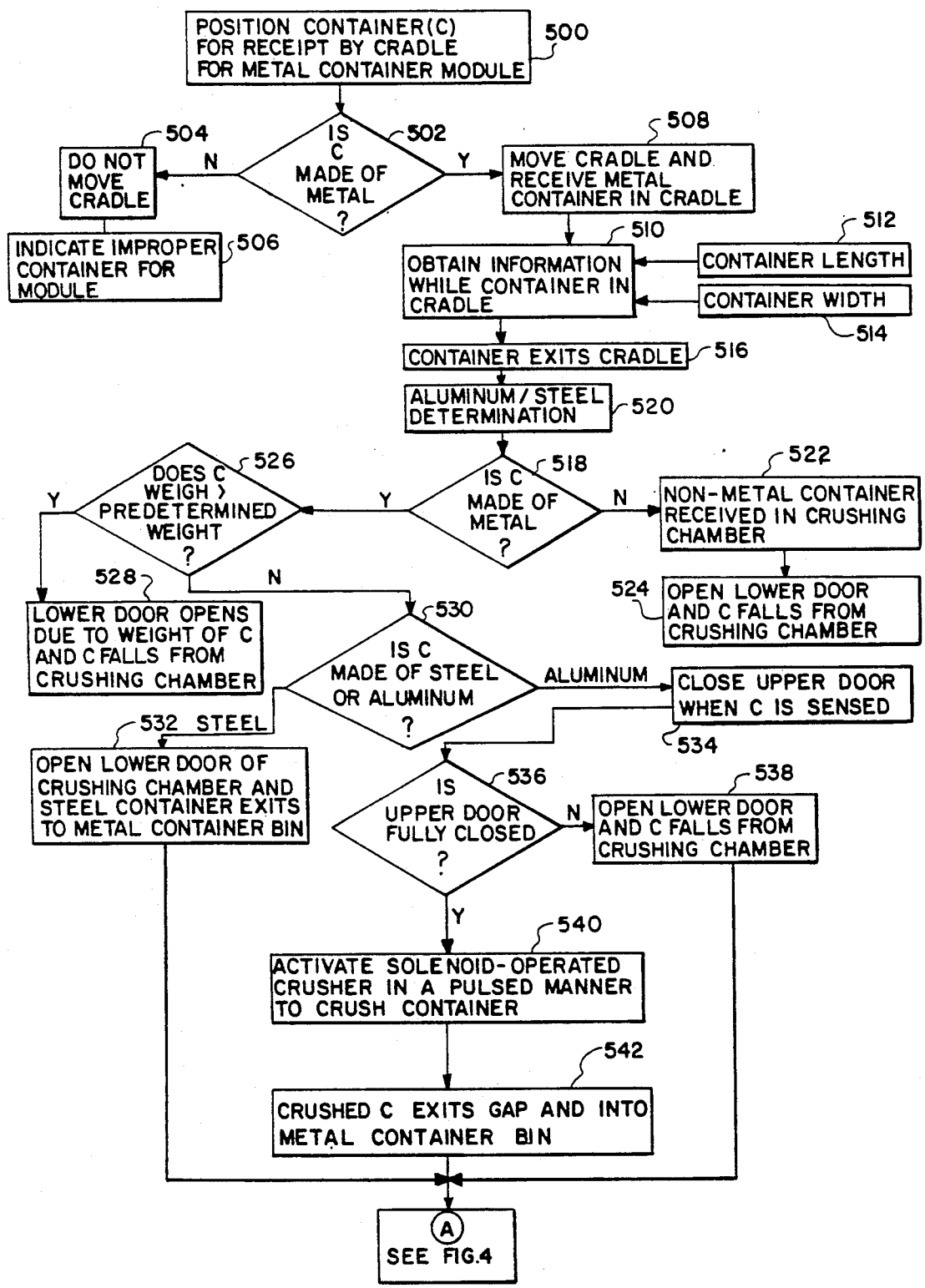
FIG. 8 shows in schematic the operational functions of the metals crushing module.

FIGS. 5 through 7 show the detail of the construction of the metals crushing module, and FIG. 8 shows the process operations. Similarities of construction to the plastics crushing module will be evident and will not be repeated.

The metals crusher module housing 270 comprises a plurality of upstanding walls 271a,b,c, with housing walls 271a and 271b having journaled therein a metals can receiving cradle 58 as best seen in FIG. 7. The cradle ends 77 are journaled in brackets 78 to rotate between the upstanding walls to 71a and b as shown best in FIG. 5. As with the plastics crusher module, there are a number of cross braces or plates 272a through 272d. The housing is mounted on appropriate slide assembly 56 best seen in FIG. 6.

The metals container deposit slot 273 is defined in stainless steel cover panel 276 (see FIG. 7) between the side walls 271a and 271b, the top cross panel 272a and a bottom slot panel 272e in which is positioned a metal detector 274 capable of determining whether a metal object has been placed in the slot to rest against the closed cradle. The closed cradle position is shown in dashed lines in FIG. 7. If metal is detected, then the cradle opens to the position shown in bold lines in FIG. 7 and the can rolls into cradle 58.

Height (can diameter) sensor system 282, 283 comprises emitter/receivers 282a and 282b disposed attached to the side walls 271b and 271a respectively. These sensors look through notches 283a and 283b disposed in the outer periphery of the end plates 77. Since the diameter of the hemi-cylindrical receiving cradle 58 is relatively small because the cans are relatively uniform, the aperture in the end walls of the receiving cradle may be placed adjacent the periphery. Thus, when the cradle rotates from the open position as show in FIG. 7 ninety degrees clockwise, the notches line up with the emitter/receivers and a beam scans the length of the receiving cradle. If the can is too big, the infrared beam is blocked and the container is deemed too large in diameter and is subsequently dumped on into the bin 24 without crushing and the depositing consumer is not paid the redemption value.

It should be understood that in cases of states where there is no redemption value, the consumer may be paid an appropriate scrap value, even for oversized containers. It should also be understood that if detector 274 does not detect metal, then the cradle 58 does not rotate open, the cradle closed position being the normal position for the cradle prior to deposit by the consumer. The sensing of the presence of the object lying on the slot floor 272e triggers the rotational opening. As before, there are a series of length sensors 284a through 284e which determine the length of the can (how tall the can is) by a reflection off the reflector tape 287 placed in the bottom dead center of the cradle. As before, finger-type shields 285 protect the sensors from being damaged by the flap 286, which in the case of this crusher module is not hinged.

When the sensor 274 detects metal, the cradle opens and the can rolls into the cradle. The cradle then continues to rotate clockwise to the position shown in dashed lines in FIG. 7, and rolls out of the cradle as shown by Arrow C through the metal loop detector 289 which in this instance is oriented horizontally. This detector works on tuned frequencies so it is able to distinguish aluminum from bi-metal cans which are predominantly "tin" cans. The cans may bounce off the slam-dunk door 290 which is shown in FIGS. 5, 6, and 7 in its up position, 290a. As shown by Arrow L in FIG. 7, the slam-dunk door is "gravity down" upon release of the lifting tension by the counter clockwise motion of the chain/crank lifting mechanism 310 (counter clockwise is seen in FIG. 7).

If the sensor 289 senses a bi-metal can, the crushing mechanism does not activate and the trap door 91, which is shown in its up position in the FIGS. 5d and 7, opens and the can falls through the hole 322 in bottom plate 272d as best shown in FIG. 7. This is shown by Arrow M, and Arrow N shows the opening of the trap door 291. If the detector 289 determines that the can is aluminum and presence sensors 294 sense the can is in place in the crushing chamber 305, and slam-dunk door sensor 309c indicates that door closed (no hinderance or misaligned can in the crush chamber), then the crusher mechanism described in more detail below activates, the can is crushed, and the crushed can 43b falls through the opening 322 as shown by Arrow M into the bin 24.

With regard to the trap door lift system, this is best understood by reference to FIGS. 5d and 7, though a portion of it is shown in FIG. 6. Chain 312a is attached to sprocket 312b. The other end of the chain 312a is attached via a spring 312c to a fixed pin 312d. The trap door 291 is pivotally hinged at its rear end. This pivot is a shaft 312e best seen in FIG. 5d. The tension of the spring rotates the gear 312b clockwise as seen in FIGS. 6 and 7, and counter clockwise as seen in FIG. 5d. This causes the trap door to be spring-biased in the "up" position. This spring has just sufficient tension to maintain the door in the up position. Thus, if a can 42a as shown in FIG. 7 is misaligned, dropping into the crush chamber 296 in a vertical position, or is at an angle, then the descending slam-dunk door 290 as shown by Arrow L in FIG. 7 will push the can on through to the bin 24 without crushing as the weight of the slam-dunk door will override the spring tension. If, on the other hand, the can is properly aligned in the crush chamber, then it will be crushed. Then counter clockwise rotation of sprocket 312f (as seen in FIG. 7) will cause chain 312g to rotate the trap door 291a to its "down" or open position shown at 291b as the forward end of chain 312g as attached to the arm 291c.

Turning now to the crusher mechanism, FIGS. 5a through 5c and 7 show the fixed anvil crusher jaw 293 disposed on the left side of the machine as seen from the front in FIG. 5. The moveable crusher jaw 292a is mounted to a cross plate 292b which in turn is secured to the two plunger rods 299 which are actuated by the two solenoids 295. The solenoids are best seen in FIG. 5.

An adjustment mechanism 323 permits precise adjustment of the size of the crush chamber 305. As in the case of the plastics crusher mechanism, there are retraction and extension bumper assemblies and stops. The extension stop assembly 300 is shown in FIG. 6.

As best seen in FIG. 7, the diameter of the cradle 58 is about 3 inches by 8½ inches long, while the crusher chamber 305 is on the order of 8½ inches long by 4 inches wide by 4 inches high. As best seen in FIGS. 5a, b and c, the two crusher jaws are identical, and include apertures 294a through which sensors 294 (see FIG. 6) look to determine whether there is an object in the crush chamber. If there is no object in the crush chamber, then no crushing cycle is initiated. As before, the sides of the crush chamber are defined by moveable plates 296 (see FIG. 7).

FIGS. 5b and 5c show special release bars 293a which are spring biased outwardly so that the surface of the bar projects beyond the face 293b by spring 293c disposed in counterbore 293d. The spring loaded bar 293a is tethered by perpendicular rods 293e which are pinned with roll pins 293f to limit the outward motion of the release bar 293a (motion to the right as seen in FIG. 5c. The motion of the release bar is shown by Arrow O in FIG. 5c. The purpose of these release bars is to help push the crushed can away from the face of the crusher jaws. Since most of the beverage cans contain sugar, and other organics, which may build up on the face of the jaws over a period of time, the crushed cans can stick to the jaws. Accordingly, the use of the release bars prevents the sticking of the cans to the jaws as compared to prior art devices.

The special case of aerosol cans is also addressed by this invention. Empty aerosol cans are classified as hazardous waste, and even when empty many still contain volatile materials such as propellants and solvents which pose an explosion problem. Aerosol cans are typically constructed of high strength alloy aluminum or steel, and are pressurized to 150 psi. An empty can may contain a few grams of waste chemical and solvent, such as insecticides, paints, varnishes, hair spray, food products, cosmetics, and the like. A propellant may be $CO_2$, or the more volatile explosive gasses such as propane, butane, isobutane, and the like. Accordingly, it is important to be able to discriminate and not crush these still-pressurized cans.

The present invention provides a number of means of discriminating and insuring that the aerosol cans are not crushed. Initially, the dimensions of the can entry slot 273 may be restricted to prevent introduction of large 12, 14, 16 and 24 ounce aerosol cans. They are simply too long to fit in the 8 to 8½ inch length of the slot and cradle 58. While they will be sensed as metal by metal detector 274, the quantity of steel or aluminum and its alloy has a somewhat different frequency which can be detected by the metal discriminator 289. This discriminator includes a tuned coil which measures the capacitance in terms of frequency of aluminum and bi-metal cans. There is a small but detectable difference between empty soda pop or beer cans and the heavier gauge (more than twice as heavy) and different alloy aluminum cans. In addition, even aluminum aerosol cans may contain some steel parts such as stainless steel springs, ball valves and like which would register as bi-metal and not be crushed as described above. Further, as best seen in FIG. 5b, a hole 324 may be provided in the center of each of the jaws. This is so that upon crushing, the plate does not contact the center stem of an aerosol can with its spray nozzle tip, but rather would contact the rolled and crimped rim of the top dome of the can. Since solenoids are used as the mechanism for crushing, they can be pulsed and the stroke pressure carefully controlled. Thus, the stroke is pulsed for up to 2/10 of a second at about 400 pounds per square inch. If there is no crush, then the crush action stops, the crusher mechanism backs off and a trap door opens to allow the object to fall into the bin. Under such pressure, the highly pressurized very strong aerosol cans will not crush and they will be dropped into the bin to be sorted by other conventional means or methods (e.g. hand sorting). The presence of the aperture 324 ensures that the slight squeeze for the up to about 2/10 of a second applied to the can to get a pressure test to determine what type of can it is (the pressurized can discrimination tests), does not merely press the aerosol nozzle, thus fooling the machine into thinking that it is a proper can to crush with the 4,000 psi. The up to 400 psi will not crush the aerosol can, but will initiate crush of the aluminum cans. Since there is movement of rods 299 for an aluminum soda pop can but not for a pressurized aerosol can this serves to discriminate between the two types of cans.

As in the case of the plastics crusher mechanism, the trap door 291 as best shown in FIG. 5d terminates about 1½ inch short of the position of the anvil 293. That is, while the dimension of the chamber is on the order of 9 inches long (the width dimension between the side walls 271a and 271b as shown in FIG. 5), the trap door has a dimension of about 8 inches so that it terminates approximately 1 inch short of the anvil. This permits the crushed can in the "hockey puck" form 43b as shown in FIG. 7 to fall into the bin 24 even if the trap door does not open.

A variety of proximity sensors 309 detect the position of various crank assemblies such as crank 310, the travelling arm 311, or the bolt 311a marking the position of the opening of the receiving cradle 58 (the same as bolt 111a) relative to sensors 109 in the case of the plastics crusher module FIG. z.

The rotation of both the cradle 58 and the trap door 291 is accomplished by motor 280 and the twin spring-biased chain drive system 313 as best seen in FIG. 5. A motor 280 drives the crank 314 to which is attached chain 315 which passes over sprocket 316 journaled on rod 317. Note that this rod extends on through to the interior of the module between the side walls 271a and 272b. The sprocket 312f as shown in FIG. 7 is mounted on the rod 317 inside the module, and activates the trap door as described above. The chain 315 is interrupted intermediate its ends by a first spring 318. A second portion of the chain then passes over sprocket 319 which is mounted on the shaft on which the cradle 58 is journaled. A second spring 320 extends between the end of the chain 315 and pin 321. This provides a double acting spring loading so that whichever way the receiving cradle is rotated, it is spring biased. Thus, as the sprocket 316 rotates clockwise, the cradle is rotated to its open position (counter clockwise as shown in FIG. 7).

An important aspect of the invention is the fact that the crushing chamber is open to the atmosphere, and the crushing jaws are apertured to permit release of air from the cans while they are being crushed even if gummy deposits build up on the faces of the crusher jaws. Since the crushing occurs so fast, in the matter of hundredths or tenths of a second, it is important to let the air escape from the can while it is being crushed so that the air does not become trapped and resist crushing during the crush compression period. As a result, the cans upon being crushed are like hockey pucks in that they are extremely dense and less than 178 inch in thickness with the accordion folds of the crushed can being essentially parallel to each other. This means the can density is a maximum. In contrast, where the crusher has to work against compressed air trapped in the can, the crushed can density is lower and fewer cans can be collected in the same bin volume.

FIG. 8 relates to the operation of the metal crusher module 28c. As before, the numbers in parenthesis refer to FIG. 8, while the other parts numbers refer to FIGS. 1, 2 and 5-7.

In particular, just as with the plastic crusher module 28 the container is first placed (500) in container receiving slot 273. Once in position, an entry detector 275 may be used to provide information that a container has been located for expected recycling. A metal detector 274 is used to determine whether or not this container is a metal container (502). If it is not a metal container, the receiving cradle does not rotate (504) to permit entry of the container. Instead, an indication is provided to the depositing person that an improper container has been placed (506) in the entry slot 273.

In the case of the metal container, the information from the metal detector 274 causes the microprocessor controller 20 to move or rotate the cradle open (508), whereby the can rolls into the cradle and the cradle reverses rotational direction. While the container is in the rotating receiving cradle 58 information (510) relating to the container length (512) and the container width (diameter) (514) is obtained for subsequent usage in determining the pay-out to the customer (see A in FIG. 4). Subsequent to obtaining such information, the container exits the receiving cradle (576) and a second determination (518) is made using an aluminum/steel detection assembly, for determining whether the container is non-metal, or is an aluminum, bi-metal or steel container (520). If a non-metal container has exited the cradle and passed into the crushing chamber (522), the trap door 291 of the crushing chamber is caused to open by the microprocessor controller 20, without the crushing operation being performed (524).

In the case of a metal container, if the container should be greater than a pre-determined weight (526) when it engages the trap door 291, it over-balances the trap door 91 which opens (528) under the weight and permits the heavier container to fall from the crush chamber into bin 24 without activation of the crushing operation.

In the case where the container weight is less than that which would cause opening of the trap door (530), if the container is made of steel, upon this container being detected as being in the crushing chamber by the chamber presence sensors 294, the lower trap door is caused to open (532) by the microprocessor controller 20 whereby the steel container exits the crushing chamber 305 to the metal container bin 24, without being crushed. Additionally, as with the plastic and glass crusher modules 28a, 28b, the predetermined customer pay-out is dispensed using the coin/token dispenser module 30 and/or the coupon printer 32 (see A in FIG. 4). And, a determination is made as to whether or not the module should be recycled, depending upon whether or not another container has been received within a pre-determined time (A in FIG. 4).

In the case of an aluminum container, however, steps (534-542) like those taken in conjunction with crushing plastic and glass containers in the plastic crusher module and the glass crusher module 28a, 28b, respectively, are conducted (534-542): That is, the inchamber presence sensors 294 close the slam-dunk door 290 (534), and when the door is fully closed (536), activate the crush mechanism (540). The crushed aluminum can ("hockey puck") drops out the gap between the end of the trap door 291 and the anvil 293 into the bin 24 (542). After these steps are performed, equivalent steps are taken in conjunction with consumer payouts and recycling of the module (see A in FIG. 4). As in all three crusher modules, since the receiving cradle mechanism and the trap door mechanism are linked, as the receiving cradle opens the trap door also opens, clearing the crush chamber at the start of each cycle.

Crusher Modules

Glass Crusher Module

Figure 9:
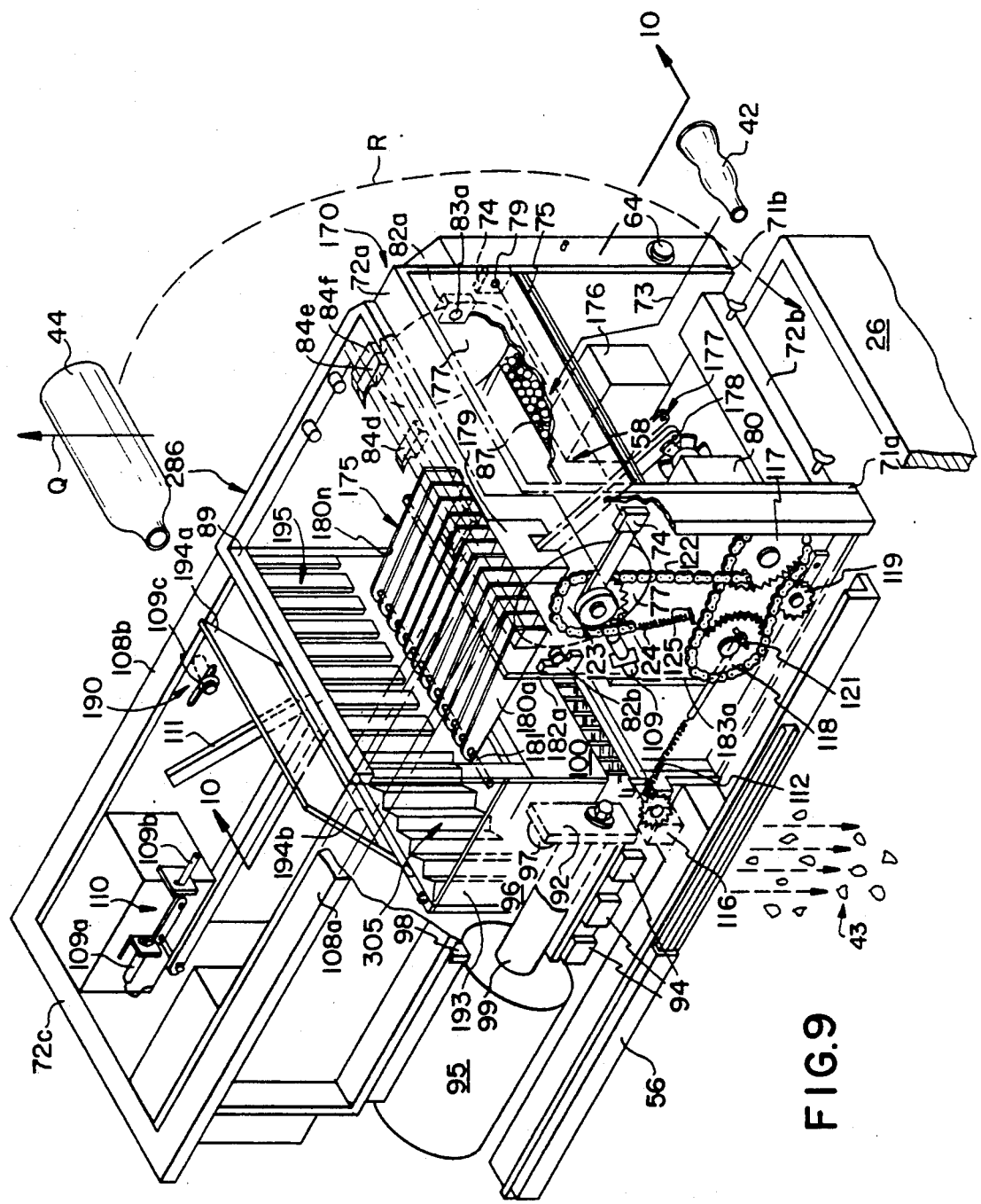
FIG. 9 is an isometric perspective view of the glass crusher module from the left side.
Figure 10:
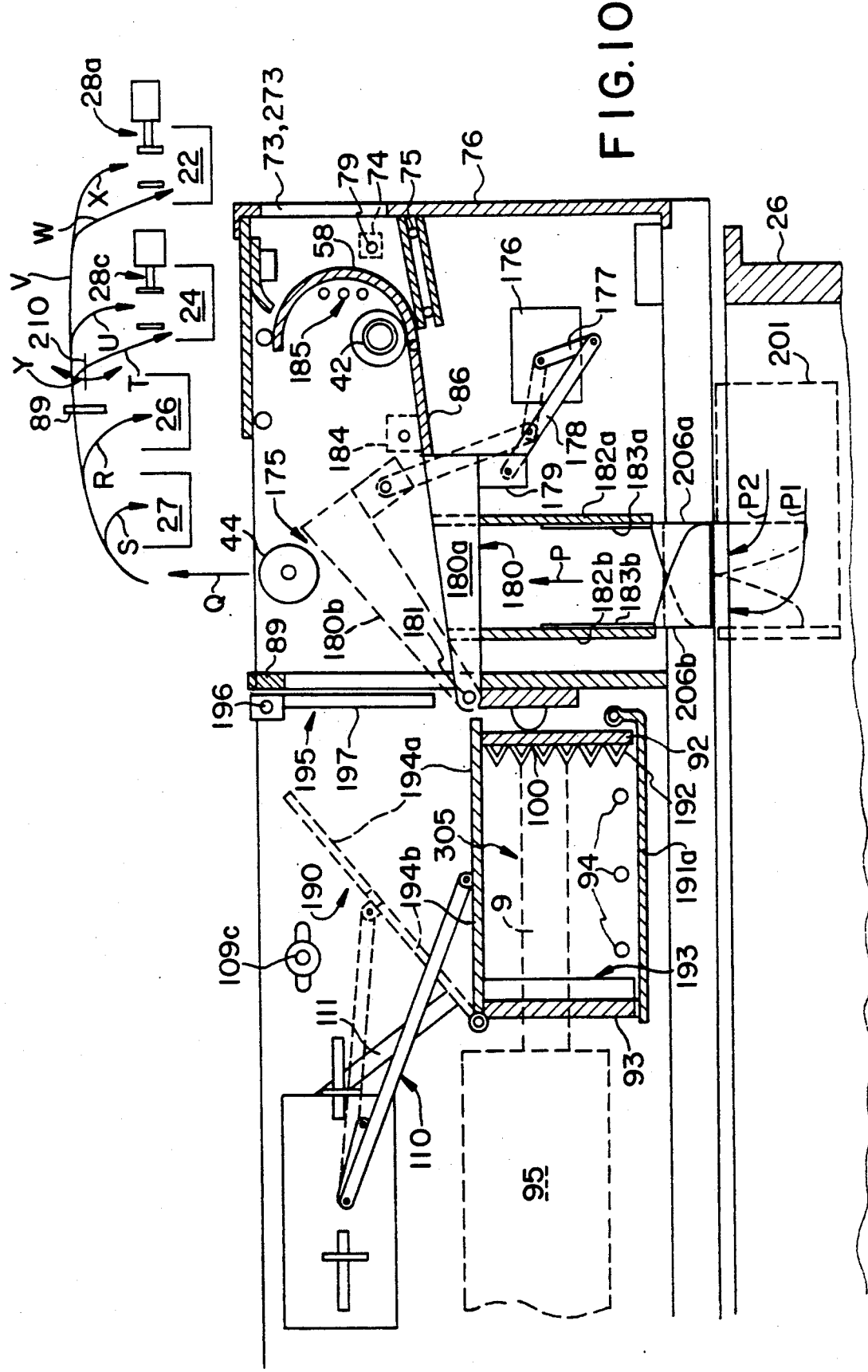
FIG. 10 is a vertical section view, partly in schematic, of the elevator grate taken along line 10—10 of FIG. 9.
Figure 11:
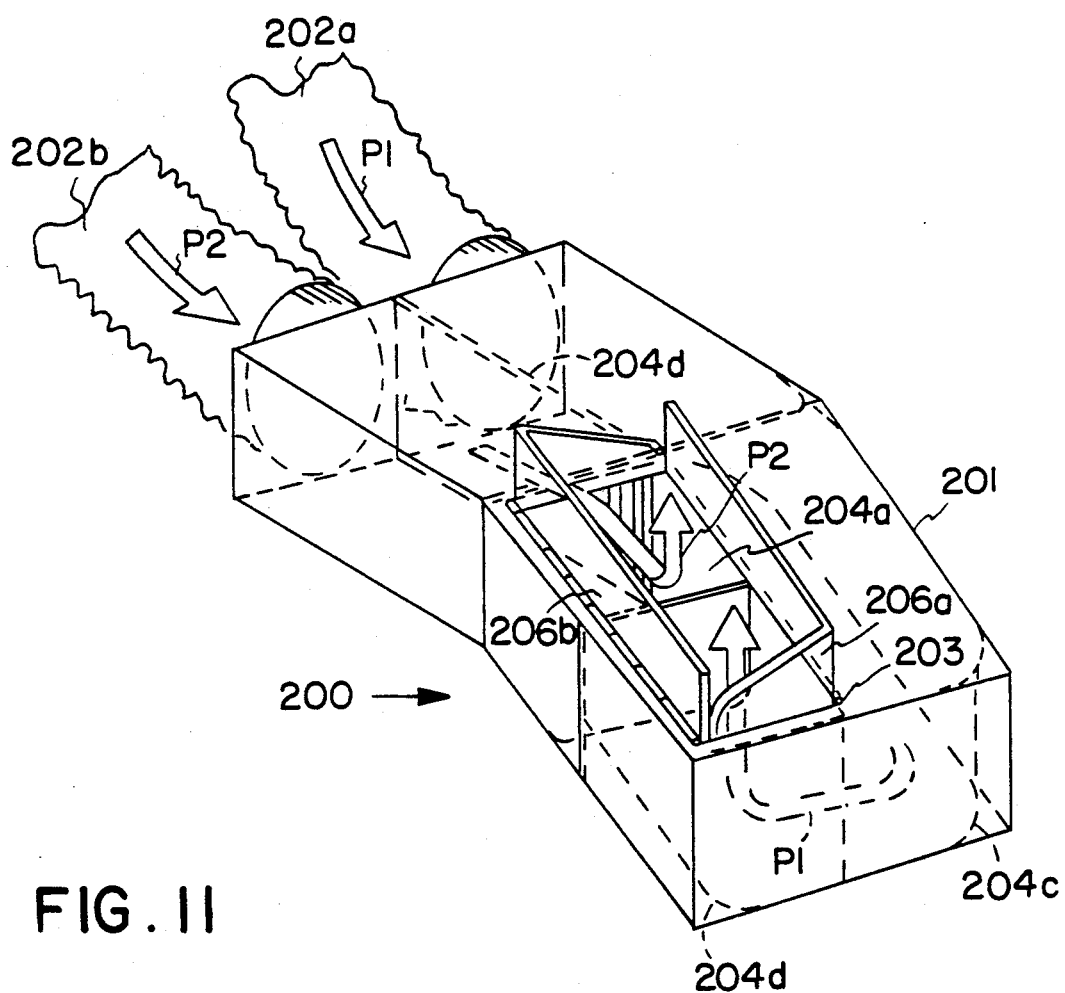
FIG. 11 is an isometric projection of the lower blown-air plenum for the glass crusher module.

The glass crusher module 28b shown in FIGS. 9 and 10 is similar in many respects to the plastics crusher module with the exception and addition of a special elevator grate assembly 175 which has an air blower feature shown in FIG. 11. The elevator grate is disposed on the outlet side of the receiving cradle flap 86 so that if a plastic bottle is put in the glass receiving chamber, and it is accepted, it will roll onto the grate 180. The grate is a slotted grate of plastic vanes. It is plastic because it extends backward through the loop-type metal detector 89. The presence of any substantial amount of moving metal would disturb the metal detector and trigger it falsely. The grate is hinged at the back by a shaft 181 that goes all the way through from side to side of the two upstanding side walls 71a and 71b. The grate is approximately 12 inches in front to back depth, and about four inches back from the front end is about a 4-inch wide plenum which extends from side wall to side wall. As the grate rises, it carries with it special sliding walls 182a, 182b that extends the ductwork 183a, 183b which comes up from the bottom.

When a person puts an object into the receiving cradle 58, it passes by the presence sensor system 74/79. That starts the blower. There is a several-second delay while the air pressure builds up before the container is accepted and the receiving cradle opens. Then the object rolls over the grate. If it is glass, it is sufficiently heavy that it will roll on into the crushing chamber, 305, and possibly might bounce off the slam-dunk door 190 before falling into the crusher chamber 305. If however, the object is plastic, or metal (e.g. aluminum can) the air pressure P will reject it 44 by blowing it straight up and out of the module. It is possible that it might blow slightly backwardly in which case there is a pivoted deflector assembly 195 including a comb or finger-type flap 197 which is suspended behind metal detector 89. This deflector keeps the plastic bottles in the air stream if they are blown back slightly, but they bounce back into the air stream P. The finger flap 197 terminates about 3½ inches above the grate when the grate is in its down position, and in the up position the grate is still approximately an inch and a half below the lower edge of the fingers. The 3½ inch gap permits glass bottles to roll straight through.

The purpose of having the grate elevatable is to ensure that slightly conical bottles roll into the crusher chamber. As best seen in FIG. 10, there is also a sensor 184 located at the front edge of the grate. If a bottle rolls through very slowly, the grate will not rise until it sees an object interrupt the beam. That triggers the lifting of the grate (position 180b) by means of the motor 176 driving crank system 177, pivoting arm 178, acting on pusher block 179. There are no chains or springs; it is simply a powered crank drive. As best seen in FIG. 9 the elevator grate is pivoted on rod 181, and is a series of spaced vertical plastic slots 180a through 180n.

The front half 194a of the slam dunk door 190 is plastic because it passes close to the magnetic loop 89. The slam-dunk door is solid, not apertured, to prevent glass shards 43 from spraying upward. They are directed downwardly through the X-met trap door 191. The trap door is very similar to the trap door on the plastics module, in that it terminates short of the full depth of the crusher chamber 305. Also the X-met openings are sufficiently large that the glass shards 43 produced fall through to the bin 26 as seen in FIG. 9.

As best seen in FIG. 10 the fixed anvil 93 comprises vertical pieces of 1" abutting angle iron 193, preferably nine irons. The movable anvil 92 has horizontally oriented angle irons 192, preferably four of them. The grooves defined between the horizontal angles hold the bottle(s) during crushing so that it does not move while being crushed, while the vertically oriented angles provide high-pressure points that crush the bottles. The slam-dunk door 190 has a traveling arm 111 which triggers proximity sensor 109c as in the plastics module. The sensor systems 82, 83, 84 in the receiving cradle, and the drive system 112-125 for both the receiving cradle and the trap door are substantially identical to the plastics crusher module. There are three presence sensors 94 across the bottom of the crusher chamber to sense the presence of an object in the chamber. The sensors 94 in the bottom of the crush chamber tell the slam-dunk door 190 to come down, and if there is no hinderance, when sensor 109c senses wand 111 showing closure of door 190 the crush cycle is initiated. If there is a mis-aligned bottle or other object in the crush chamber, then it will be pushed on through with the trap door 191 opening, and the object will not be crushed. The crusher mechanism 95, 99 operates the same way as in the plastics module, and has the same type of bumper systems 97, 100.

As shown best in the upper schematic section of FIG. ID, the plastic bottle or can 44 which is blown upwardly out of the elevator grate by the air stream Q will then be airveyored and ducted either to the plastics crusher module 28a (air path V), or to a separate bin 27 (air path S), or back into the glass bin 26 itself (path R). As shown in FIG. 9, it is preferably ducted via path R back to the glass bin 26 where it is easily separated by hand sorting.

As shown in the upper portion of FIG. 10, the rejected container 44 traveling along path Q may pass through a metal detector 89. If it is not metal, then an articulated damper 210 diverts the container into the path V which puts it directly into the crusher chamber of the plastics crusher module 28a via path X, or diverts it into the bin 22 via path W. If it is a metal container, then the vane moves upwardly, see arrow Y, causing the container to either be diverted into the crusher chamber of the metals crushing module 28c via path U, or directly into the metals bin 24 via path T. An additional tuned capacitance detector can be placed in the common path before the paths T and U branch to direct aluminum cans into the crusher chamber of module 28c, while the bi-metal cans go directly into the bin 24 as shown by path T.

FIG. 11 shows the air handling and plenum system 200 which directs the air P (see FIG. 10) upwardly through the center portion of the elevator grate assembly 175. One or more fans (not shown but similar to the fan 81 in FIG. 3) forces air as shown by arrows $P_1$ and $P_2$ through accordion-ducts 202a and 202b into a plenum 201. This plenum has a series of internal baffles 204a-204d as shown which divide the plenum into two paths, air path $P_1$ and $P_2$. The baffles 204b and c are curved to assist in a smooth air flow. The lower edge of the divider baffle 204a is also curved to assist in turning the air in path $P_2$ upwardly. These baffles provide a satisfactory air flow to cause "blow-out" rejection of plastic or metal cans out of the module as shown in FIG. 10.

A pair of L-shaped dampers 206a and 206b are employed to provide an air seal juncture with the fixed baffles 183a and 183b in the glass crusher module. Recall that the glass crusher module may be rolled out on its slides 56. When the air is cut off, the baffles 206 drop down by gravity, or may be spring biased in the down position so that the module may be rolled out while the air handling system and duct assembly 200 stays in place within the machine. Once the glass crusher module is returned to its operational position and locked in place, then when the air is turned on these baffles 206 rise by air pressure making a tight seal so there is no fugitive dust comprising finely ground particles of glass blowing around within the machine and out into the face of the consumer when the cradle 58 opens to accept the glass bottle. Appropriate filters may be used throughout the air handling system as needed. Likewise, rubber strips may be placed along the appropriate surfaces such as along the exterior surfaces of the L-shaped damper plates 206a and 206b to make better seals where needed. Similarly, the bottom surface of the receiving cylinder 58 may have a rolling seal (not shown) to provide a good seal if necessary.

Figure 12:
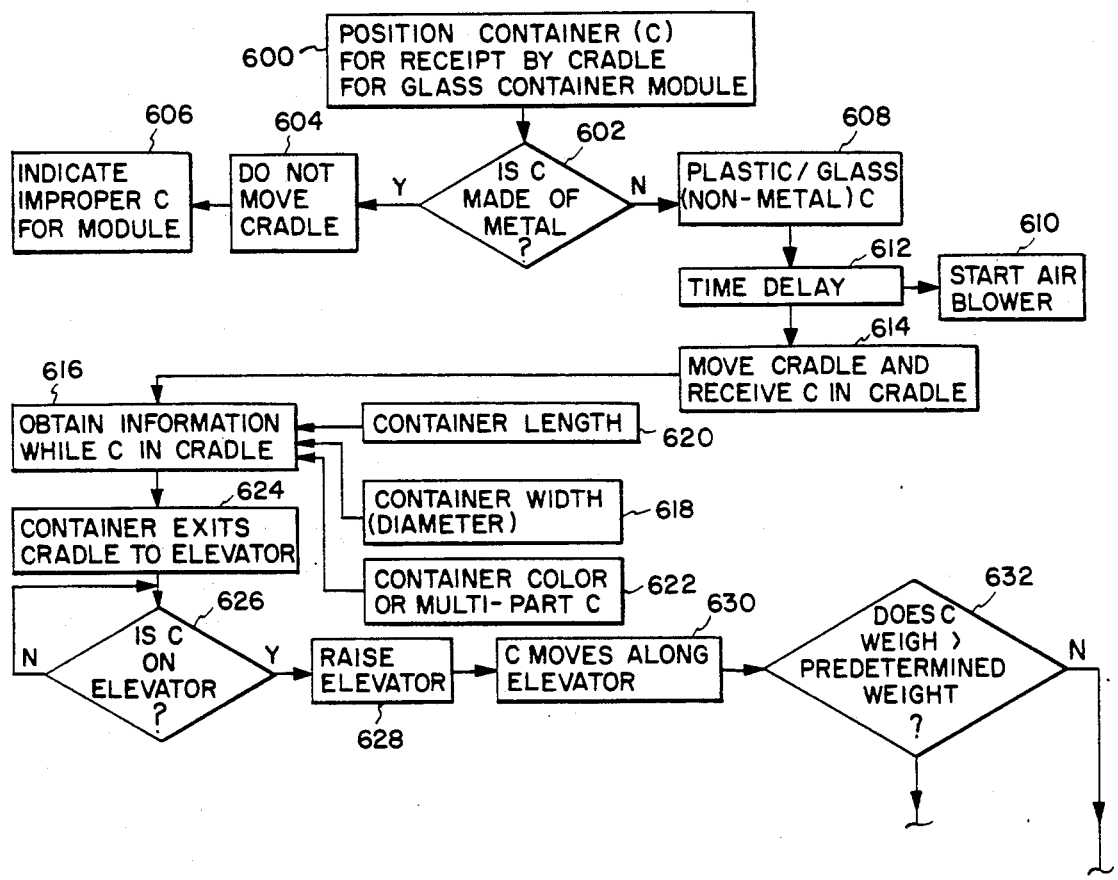
FIG. 12 is a schematic of the operational functions of the glass crusher module.
Figure 12:
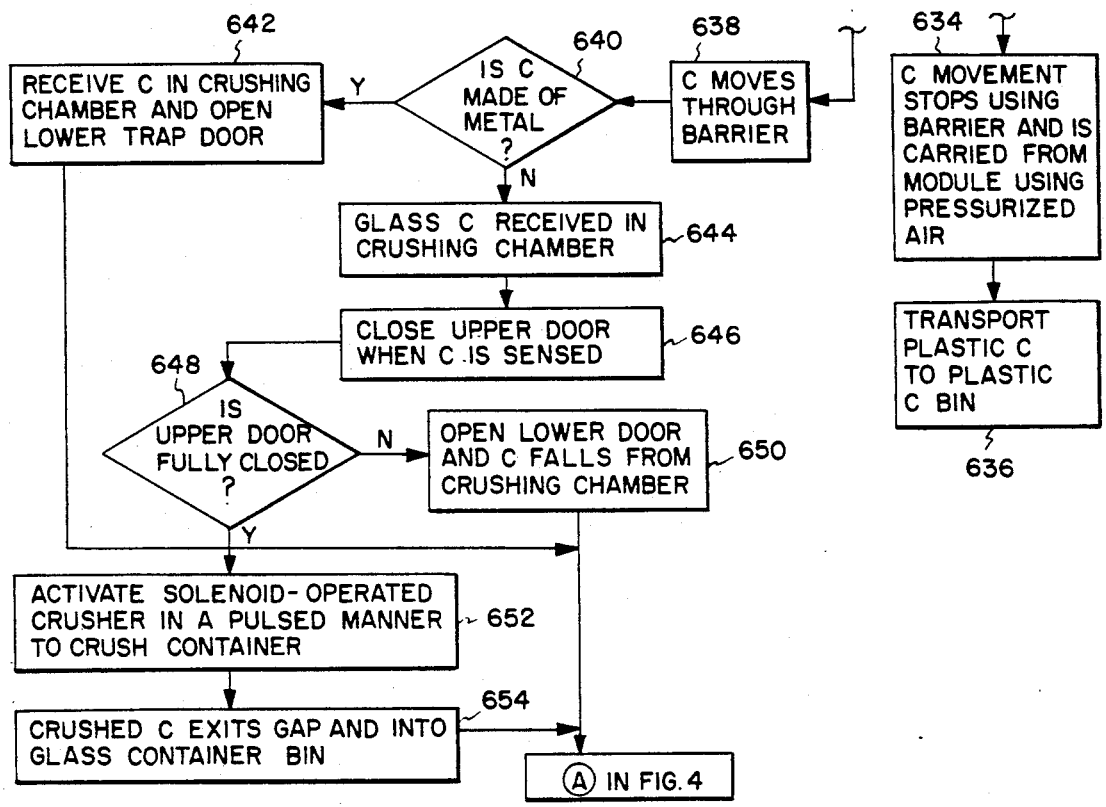

With reference to FIG. 12, the operations of the glass crusher module 28b, will now be described in greater detail. As before, numbers in parenthesis refer to FIG. 12, while parts number refer to FIGS. 1, 2 and 9-11.

Like the plastics crusher module 28a, a determination is made as to whether or not a container 42 is located at the entry slot 73 using entry detector 72 (600). Additionally, using a metal detector 75, a determination is made as to whether or not it is a metal container (602). In the case of a metal container, the receiving cradle 58 is not moved (604) and an indication is provided that a metal container, not a glass container, has been improperly offered (606) by the consumer. There are no payouts or coupons dispensed. In the case in which a nonmetal container has been placed in the bin entry slot 73, the entry detector 74 and the metal detector 75 indicate an appropriate container (608). With this determination, the air blower 81 is energized or activated (610) and, after a short time delay (612), the receiving cradle 58 rotates and the container moves or rolls into the receiving cradle 58 (614).

During rotational movement of the receiving cradle 58, information is obtained (616) relating to the container, i.e., the height (diameter) sensor system 82/83 is used in determining the diameter of the container and transmits the information to the MPC 20 (618). The length sensor system 84 provides an input to the MPC 20 for determining a magnitude relating to the length of the container in the cradle (620). Additionally, the color/multi-part sensor system 185 (see part B. 4. of the Detailed Description below), provides an input for use in determining color (622) associated with the container while it is in the receiving cradle 58.

As the receiving cradle 58 continues to rotate, it eventually is in a position whereby the container exits (rolls) therefrom down a slight incline toward the elevator grate assembly 175. The elevator sensor 184 detects whether or not the container has crossed onto the elevator grate 180 (626). When this occurs, the elevator grate assembly is raised to an inclined position whereby the container moves in the module along the elevator grate 180 (630). While on the grate, if the container does not have a weight greater than a predetermined weight (632), the pressurized air P into the glass crusher module 28b via duct system (FIG. 11) causes the relatively light container 44 to be blown upwardly out of the module (634) along air paths Q-X. The barrier 195 insures the blown container stays in the air paths P-Q. This would occur where a substantially plastic container, in some fashion, was placed into or received by the receiving cradle 58. Such an improper plastic container is transported to the plastic container bin 22 (636) or one of the other bins as described above with reference to FIG. 10.

Where the container is the proper glass container, it is of sufficient weight to be able to roll underneath the barrier (638). However, it may also be that a metal container of sufficient weight has improperly been substituted for a glass container and can move through the barrier. As the container moves through the barrier, the second or verifying check of the material composition of the container is made using a metal detector 195 (640). If the metal detector determines that the container is metal, when the container is received in the crushing chamber, the microprocessor controller 20 causes the lower trap door 191 to open, whereby the unwanted metal container is released (642) from the glass crusher module 28b into bin 26. As with the plastic crusher module 28a, the MPC 20 may be programmed to control the coin/token dispenser module 30 (FIG. 13, 13a) to dispense a correct amount of coins, tokens and/or coupons as if a proper container was received by the glass crusher module 28b. See A in FIG. 4.

In the case where a proper glass container has been received in the crushing chamber (644), essentially the same steps are employed, as were performed in conjunction with the crushing of a plastic container in the plastic crusher module 28a. That is, the upper or slam-dunk door (190) is caused to close (646) and a check is made to determine whether or not it is substantially, fully closed (648). If not, the lower or trap door 191 is opened to permit the misaligned or improperly positioned container to fall (650) from the crushing chamber into bin 26. In such a case, the MPC 20 controls the coin/token dispenser module 30 so that it dispenses the correct amount of coins, for example, as if the container were properly crushed. See A in FIG. 4.

Where the container is sensed by sensors 94, 109c as being properly in the crushing chamber 305, the solenoids 95 are activated in a pulsed manner to cause the front crusher jaw to move in discrete, but rapid, steps as it crushes the glass container (652). In the case of the glass container, the crusher jaw includes a number of peaks or projections which enable the glass container to be ruptured or crushed at a relatively much lower force. After crushing, the crushed glass is able to escape (654)

the gap between the front crusher jaw and the end of the lower trap door/90.

Comparable to the operation of the plastic crusher module 28a, predetermined coins, tokens, coupons and/or other items are dispensed by the recycling machine, depending upon the size of the container, see A in FIG. 4. Additionally, a timer is checked to determine whether or not the pre-determined amount of time has elapsed since receipt of a glass container into the module. Depending on the result of this determination, the module may be cycled in preparation for receipt of another glass container.

Crusher Modules

Plastic or Glass Color/Multi-Piece Container Discrimination System.

An important aspect of the plastics and glass modules 28a and 28b is the use of plural sensors disposed to span the end plates 77 of the cradle 58 to discriminate between colored glass and multipiece containers. These sensors look down the length of the cradle, that is end to end of the container, to eliminate the interference of a label. Preferably, these three emitters and receivers are disposed intermediate the bottom outer periphery of cradle 58 and the center line of the cradle. That is, they are oriented along the "shoulder" of the container.

Table I below is a chart of how the visibility of each beam translates into a logic system for discriminating amongst the various containers. In the table, "NO" means that the beam is interrupted; the receiver cannot see the beam. In contrast, "YES" means that the receiver receives (sees) the beam.

Emitter/Receiver 1 is a "weak" I/R beam system; that is, the beam is easily blocked. E/R system 2 is only able to "see" or project a beam through clear glass or plastic. Finally, E/R system 3 is the strongest of the three beams and is able to project a beam through everything but opaque objects. For example, the E/R1 system is a low power beam, while the E/R3 system is a stronger beam. The E/R2 system is a filtered beam with appropriate colored filters so that the presence of green or brown bottles effectively filter out the wave length so that nothing is received by the receiver R2.

TABLE I

|  | Clear One Piece | Color 1 Piece | Two Piece |
|---|---|---|---|
| E/R 1 | No | No | No |
| E/R 2 | Yes | No | No |
| E/R 3 | Yes | Yes | No |

As can be seen from the chart, in the case of a clear one-piece plastic or glass container, since there is an object present and the E/R1 system can only see through air and not if there is any object in the way, but the other two beams are able to see through the container easily because it is clear and one piece, the NO, YES, YES signals indicate to the MPC that there is a clear, one-piece container in the cradle. In contrast, the NO, NO, YES result for colored one-piece indicates to the MPC logic that there is a colored one-piece container since E/R2 system has its beam filtered out by the color of the container, be it green, brown or some other color of container. In contrast, where there is a two piece container, either a black-bottom plastic container or some type of composite glass container with a top or cap, the E/R3 system cannot see anything and the third "NO" of the NO, NO, NO logic indicates to the MPC that there is a multi-piece container in the cradle. From this matrix, the appropriate consumer payout or rejection of container can be made as above described.

Coin Hopper Module

FIG. 13 shows in isometric projection important details of the coin/token dispenser module 30 which is mounted on a pair of slides 56 for easy roll-out as best shown in FIG. 1 The module comprises one or more (preferably 2) standard coin or token feeder mechanisms 215, preferably the belt-driven type which drop tokens or coins 216a, b, c into funnel assembly 217 to be dispensed from the coin/token and coupon dispensing slot assembly 31 via guideway 218. As shown, the dispenser 215a contains pennies and the dispenser 215b contains nickels. Thus, as the MPC 20 determines the proper payout, the proper amount of coins are then dispensed while the printer module (as shown in FIGS. 1 and 14) prints out and dispenses the promotional coupons.

Also shown in FIGS. 13 and schematic section view FIG. 13a, the large coin-holding needs of this system requires specially designed coin hoppers because the conventional units such as the feeders 215 operate by belt drives 219 which become easily overloaded by the weight of the coins above the belts. Accordingly, there is provided in this invention an auxiliary coin hopper 220 associated with each feeder 215. The auxiliary hopper is a side feeding coin hopper having a false floor 221 which feeds coins through a special aperture 222 in the side wall of the coin feeder 215. This means that the coin level never rises above the line 223 and thus the coin belt drive 219 never gets overloaded. There may be a lockable door 224 in the auxiliary hopper to provide for access to refill the hoppers. In the examples shown, the coin hopper 215 is a conventional coin hopper sold by Coin Controls Company of England under the name "Universal Coin Hopper." The information received by the microprocessor controller 20 on the proper number of coins to be dispensed then triggers the rotation of the belt in coin dispenser 215a to dispense say two pennies for a single container, coins 216b and 216c, and triggers the belt drive in hopper 215b to dispense the nickel 216a for a total payout of 7¢.

Printer Module

FIG. 14 shows in isometric projection the printer module 32 mounted on slides 56. Note the location of the printer module in FIG. 1 as being associated with each of the crusher modules 28a, b, and c respectively. Note also in FIG. 14 the coin/token and coupon dispensing slot assembly 31 in phantom, as well as the on board computer 18, the MPC controller 20, one or both of which contains modem 34. For example, the printer module 32 associated with the plastics crusher module 28a may have disposed therebelow the on board computer 18, while the printer module 32 in association with the glass crusher module 28b may have the microprocessor controller 20 associated therebelow.

The relation between the coupon printer module 32 and the coin/token and coupon dispensing slot assembly 31 is such that upon the MPC determining from the sensed data that the proper container has been deposited in the appropriate slot and crushed, there is then instantly printed out a coupon 60 which is dispensed in the coupon slot 330. The coin/token tray 331 is adjacent to it and the two may be conveniently separated as shown by baffle 332. As with a typical coin/slot, the bottom can be rounded to facilitate removal of the coins and/or coupons. The coins feed down the inclined ramp 333 from the coin/token dispenser module ramp 218 disposed in cooperative alignment thereabove as best seen in FIG. 1.

The coupon printer module 32 includes a tray 334 which may contain pre-printed, unprinted, or partially printed coupons 335 in continuous (fan-folded) array as shown. The coupons are held down by spring biased roller 336, and they are fed over a guide 337 into the rear of the printer assembly 338 As described in more detail in the co-pending application Ser. No. 462,394, the printer 338 is controlled through the on board computer 18 either directly or via remote location such as a coupon sponsor so that the printer head 339 can print out the coupons for the customer instantaneously as the consumer is redeeming the cans. Individual coupons are cut off by feeder cutter 340 and dispensed in slot 330 for receipt by the consumer. The consumer can then a few minutes later redeem the cents-off coupons received as part of the three part coupon 60 dispensed by the recycling machine. In a preferred mode, information from the redeemed coupons is then read by the bar code reader 65 (see FIG. 1a) at the grocery checkout, and the data is then forwarded to and stored in the on board computer 18. Coupon sponsors or providers can remotely monitor the information to determine redemption patterns, and can instantaneously change the offerings on the various coupons. In addition, various other types of incentives are provided on the multi-part coupon 60 such as rub off games, sweepstake entries, and saver stamps.

As shown in FIG. 14, the microprocessor 20 or on board computer 18 may contain a plurality of boards 345a-e which contain a number of chips which are easily accessible for servicing or replacement by rolling out the computer or controller modules 18, 20 on slides 56.

Each of the various modules described herein, the crusher modules, the coin/token dispenser module, the coin/token and coupon dispensing slot assembly, the coupon printer module, the on board computer, the microprocessor controller module and the various bins can be easily slid out for service, and removed or replaced.

It should be understood that various modifications within the scope of this invention can be made by one of ordinary skill in the art without departing from the spirit thereof. For example, the crusher modules of this invention may be modified to accept a wide variety of other recyclable containers, not just beverage containers. Likewise the machine may be vertically subdivided so the plastics crusher module, an MPC, a printer, the coin dispenser module and crushed container bin stands alone separately from the other modules (glass and/or metal) where only plastics is needed to be redeemed. Likewise a glass machine can stand alone, or a metal machine can stand alone. I therefore wish my invention to be defined by the scope of the appended claims as broadly as the prior art will permit, and in view of the specification if need be.

What is claimed is:

1. An apparatus for recycling container, comprising:
   first means for determining whether a container includes at least a threshold amount of metal, the container being substantially made of glass;
   second means for receiving the container;
   third means for providing information relating to the size of the container;
   fourth means disposed downstream of said first means relative to movement of the container, for checking whether the container has a predetermined amount of metal;
   fifth means for crushing the container;
   chute means through which the glass container is able to move from said second means;
   elevator means connected to said chute means, said elevator means being adapted to be raised and lowered;
   duct means connected to said chute means for carrying pressurized air; and
   pressurized air means for supplying air to said duct means.

2. An apparatus, as claimed in claim 1, further including:
   container sensing means disposed adjacent to said elevator means for detecting when the container is on said elevator means and wherein said elevator means moves upwardly at an incline when said container sensing means detects the presence of the container.

3. An apparatus, as claimed in claim 1, wherein:
   said elevator means includes a plurality of fins that are laterally spaced from each other and each extends in a longitudinal direction towards said fifth means.

4. An apparatus, as claimed in claim 1, further including:
   barrier means disposed adjacent to said elevator means and in the path of the container for providing sufficient resistance to movement of a container that is made substantially of a plastic material wherein pressurized air from said duct means is of sufficient force to cause the plastic container to be removed from said chute means.

5. An apparatus, as claimed in claim 4, wherein:
   said resistance provided by said barrier means to a container that is substantially made of glass is insufficient to prevent its movement through said barrier means whereby the glass container moves past said barrier means.

6. An apparatus for recycling containers, comprising:
   first means for determining whether a container includes at least a threshold amount of metal;
   second means for receiving the container;
   third means for providing information relating to the size of the container;
   fourth means, disposed downstream of said first means relative to movement of the container, for checking whether the container has a predetermined amount of metal;
   fifth means for crushing the container;
   chute means, adjacent to said second means, having a passageway through which the container moves;
   duct means connected to said chute means for carrying pressurized air;
   pressurized air means for supplying pressurized air to said duct means; and
   a crushing chamber for receipt of the container to be crushed, said crushing chamber being in communication with said pressurized air means to provide a substantially closed loop air supply for creating reduced pressure to assist in movement of the container relative to said crushing chamber.

7. An apparatus, as claimed in claim 6, further including:
 means for determining whether said upper door is substantially closed.

8. An apparatus, as claimed in claim 7, wherein:
said means for determining includes proximity switch means.

9. An apparatus for recycling containers, comprising:
first means for determining whether a container includes at least a threshold amount of metal;
second means for receiving the container;
third means for providing information relating to the size of the container;
fourth means, disposed downstream of said first means relative to movement of the container, for checking whether the container has a predetermined amount of metal;
fifth means for crushing the container, said fifth means including a container crushing chamber that has a movable lower door; and
means for causing movement of said lower door in response to a determination that said crushing chamber contains a container made substantially of an unwanted material.

* * * * *